(12) United States Patent
Malarky et al.

(10) Patent No.: US 7,706,787 B2
(45) Date of Patent: Apr. 27, 2010

(54) MULTI-BEAM COMMUNICATION SYSTEM AND METHOD

(75) Inventors: Alastair Malarky, Manheim (CA); Trevor Jones, Manotick (CA)

(73) Assignee: Com Dev International Ltd., Cambridge (CA)

( * ) Notice: Subject to any disclaimer, the term of this patent is extended or adjusted under 35 U.S.C. 154(b) by 499 days.

(21) Appl. No.: 11/689,249

(22) Filed: Mar. 21, 2007

(65) Prior Publication Data
US 2008/0233865 A1 Sep. 25, 2008

(51) Int. Cl.
*H04Q 7/20* (2006.01)
*H04B 7/185* (2006.01)
*H04B 7/19* (2006.01)

(52) U.S. Cl. .............. 455/429; 455/12.1; 455/13.2; 455/427; 455/447

(58) Field of Classification Search ......... 455/429, 455/427, 12.1, 13.3, 447
See application file for complete search history.

(56) References Cited

U.S. PATENT DOCUMENTS

| | | | |
|---|---|---|---|
| 2,088,341 | A | 7/1937 | Rabe |
| 6,600,921 | B1 | 7/2003 | Pietrusiak |
| 6,748,218 | B1 | 6/2004 | Johnson et al. |
| 6,944,140 | B1 | 9/2005 | Linsky et al. |
| 7,006,789 | B2 * | 2/2006 | Karabinis et al. ......... 455/12.1 |
| 7,437,123 | B2 * | 10/2008 | Karabinis et al. ......... 455/12.1 |
| 2003/0068978 | A1 * | 4/2003 | Karabinis et al. ......... 455/12.1 |
| 2003/0134635 | A1 | 7/2003 | Lane et al. |
| 2004/0014472 | A1 | 1/2004 | de La Chapelle et al. |
| 2004/0092227 | A1 | 5/2004 | Sarraf et al. |
| 2004/0192376 | A1 | 9/2004 | Grybos |
| 2004/0224633 | A1 | 11/2004 | Coromina et al. |
| 2005/0197060 | A1 | 9/2005 | Hedinger et al. |
| 2005/0273822 | A1 | 12/2005 | Snell et al. |
| 2005/0286448 | A1 | 12/2005 | Proctor et al. |
| 2006/0040657 | A1 * | 2/2006 | Karabinis et al. ........... 455/427 |
| 2006/0189275 | A1 * | 8/2006 | Karabinis .................. 455/12.1 |

FOREIGN PATENT DOCUMENTS

| | | |
|---|---|---|
| EP | 1089459 | 4/2001 |
| EP | 1168672 | 1/2002 |

(Continued)

OTHER PUBLICATIONS

Application of The DIRECTV Group, Inc. For Minor Modification, FCC Submission, File No. SAT-MOD-2004, Washington, D.C., United States of America, certified on Jun. 14, 2004.

(Continued)

*Primary Examiner*—Tilahun Gesesse
(74) *Attorney, Agent, or Firm*—Isis E. Caulder; Bereskin & Parr LLP

(57) ABSTRACT

A method of flexibly allocating capacity in a satellite coverage area, comprising establishing a frequency reuse pattern of at least two interleaved sets of cells, assigning a polarization to each set of cells, such that adjacent sets of cells alternate in orthogonal polarization, flexibly assigning satellite transmit power to at least one cell, flexibly assigning frequency and bandwidth to at least one cell, and moving frequencies, bandwidths, and satellite transmit power among the cells within each set, independently of the other sets, ensuring that at all times no two adjacent cells within a given set share a common frequency.

24 Claims, 25 Drawing Sheets

FOREIGN PATENT DOCUMENTS

WO  WO 2004/103325  12/2004

OTHER PUBLICATIONS

Guilhem, Introduction of Eurostar E3000 Series & In-Orbit Operation, 56th International Astronautical Congress Oct. 17-21, 2005, Fukuoka, Japan.

Lutz et al., Future Aeronautical Satellite Services and Systems, AIAA International Air and Space Symposeum and Exposition: The Next 100 Years, AIAA-2003-2607, Jul. 14-17, 2003.

Extended European Search Report dated Sep. 5, 2008.

* cited by examiner

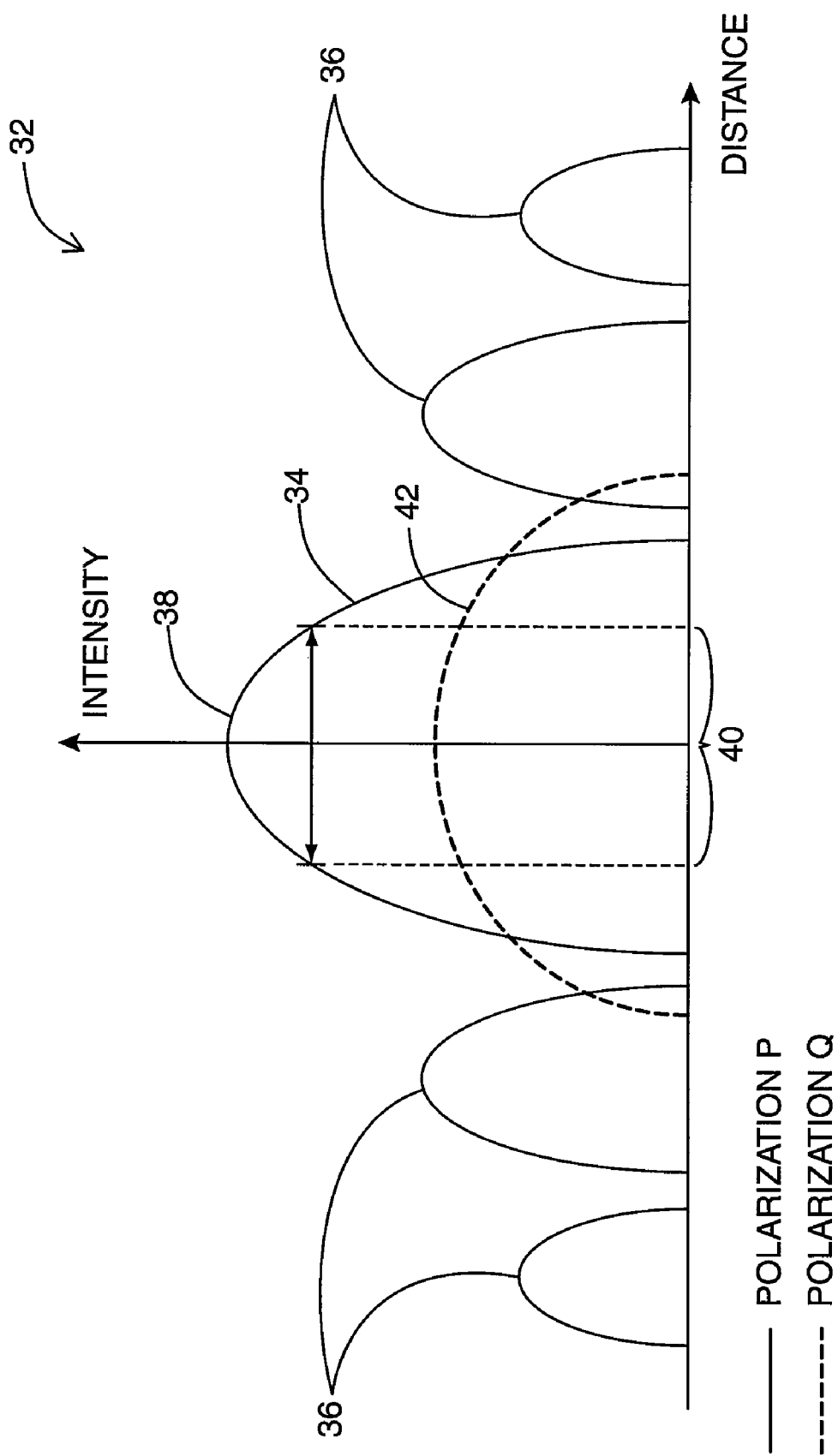

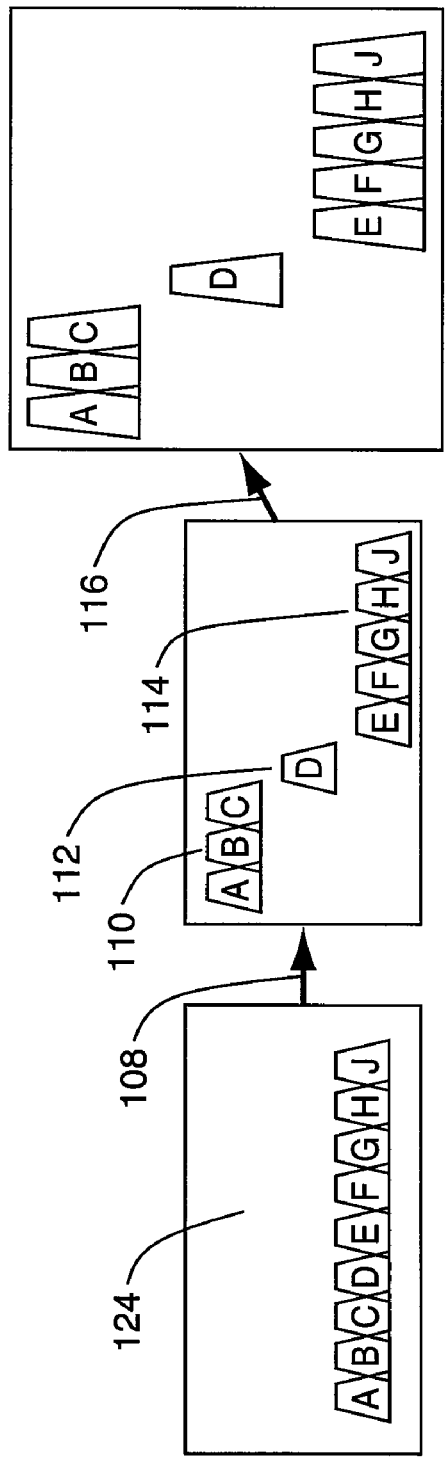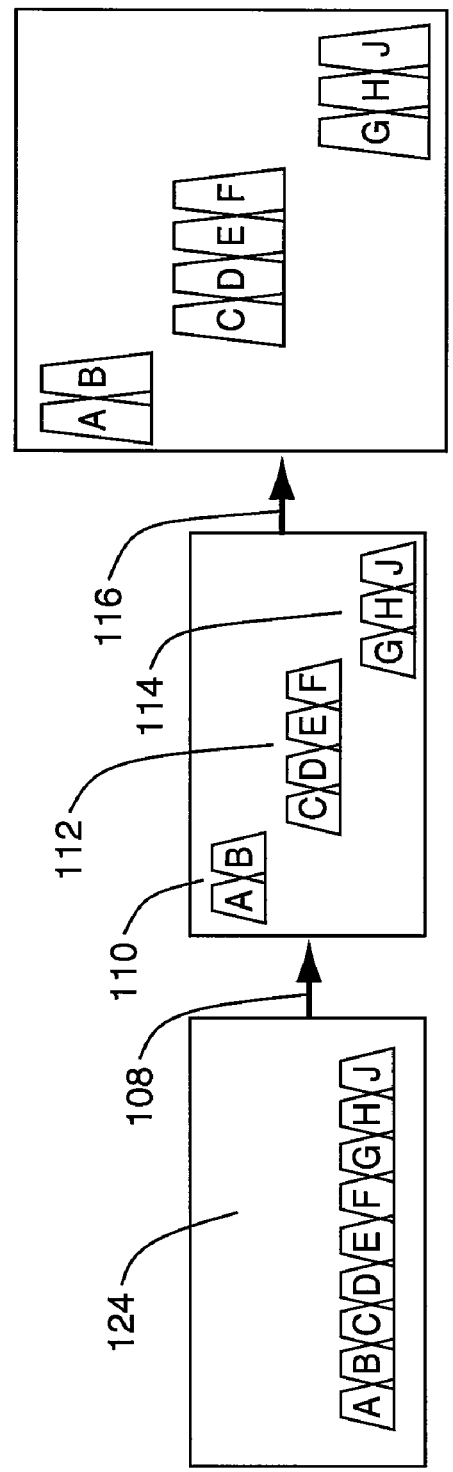

FIG. 9C

| FEED NO. | NUMBER OF SUB-BANDS PER FEED | | | | | | | | | | | | | | | | | | | | | |
|---|---|---|---|---|---|---|---|---|---|---|---|---|---|---|---|---|---|---|---|---|---|---|
| 128 | 4 | 4 | 4 | 4 | 4 | 3 | 3 | 3 | 3 | 3 | 3 | 3 | 3 | 2 | 2 | 2 | 2 | 2 | 2 | 2 | 2 | 2 |
| 130 | 3 | 2 | 2 | 1 | 1 | 4 | 3 | 3 | 2 | 2 | 2 | 2 | 1 | 4 | 4 | 3 | 3 | 3 | 3 | 2 | 2 | 1 |
| 132 | 1 | 2 | 1 | 3 | 2 | 1 | 2 | 1 | 3 | 1 | 3 | 2 | 3 | 2 | 1 | 3 | 2 | 1 | 2 | 3 | 2 | 3 |
| 134 | 1 | 1 | 2 | 1 | 2 | 1 | 1 | 2 | 1 | 3 | 2 | 2 | 1 | 1 | 2 | 1 | 2 | 3 | 2 | 2 | 3 | 3 |

MULTI-BEAM COMMUNICATION SYSTEM AND METHOD

FIELD

The embodiments described herein relate to cell patterns of multi-beam satellite communication systems and in particular flexible frequency reuse beam patterns for multi-beam satellite communication systems.

BACKGROUND

Satellite communications systems are proliferating as new communications technology is developed, and as consumer demand for wireless satellite communications increases. The increased demand for wireless data traffic has created a need for higher capacity communications systems. As the spectrum that is allocated to satellite communications is limited, frequency spectrum has become a valuable commodity. Ideally, a satellite system will cover as much territory as possible using the least amount of allocated bandwidth possible while compromising capacity as little as possible.

A common method used in the art of multi-beam communications systems is to reuse a given frequency in as many of the beams from an orbital location as possible, rather than using a unique frequency for each additional beam. Any frequency reuse pattern must, however, take into account that the capacity per bandwidth can be compromised by interference between proximal or adjacent spot beams of common frequencies. Additionally sharing satellite transmit power between beams is often a key limitation on the achievable reuse.

In today's evolving market, another very desirable quality of a frequency reuse pattern is to provide both short-term and long-term flexibility in allocating capacity and satellite transmit power between the spot beams in the frequency reuse pattern. Short-term flexibility allows a provider to respond, for example, to changes in capacity requirements due to variations in time zones. Long-term flexibility is desirable to provide for new capacity requirements as new technologies are developed and marketed. Achieving such flexibility has often been restricted by the frequency reuse approaches of current systems. Finally, here is also interest from operators in the long term growth potential of a system.

SUMMARY

The embodiments described herein provide in one aspect, a method for accommodating changes in capacity requirements in the service area of at least one satellite comprising:

subdividing the service area into at least two interleaved sets of cells;

assigning one of two orthogonal polarizations to each set of cells, such that adjacent cells from different sets alternate in polarization;

providing for flexible allocation of satellite transmit power to at least one cell in at least a first set of cells;

providing for flexible allocation of bandwidth and frequency to at least one cell in, at least, the first set of cells, and providing that no two adjacent cells within the sets of cells share a common frequency at any given time; and, reallocating satellite transmit power, bandwidth and frequency among the cells of at least the first set of cells, independently of the satellite transmit power, bandwidth and frequencies of the cells in other sets of cells, in response to changes in capacity requirements in the service area.

The embodiments described herein provide in another aspect a method for accommodating changes in capacity requirements in a service area covered by at least two orbital slots, the method comprising:

subdividing the service area into at least two interleaved sets of cells;

providing for at least two sets of beams from a first satellite in a first orbital slot to service at least two of the interleaved sets of cells;

assigning a polarization to each set of beams from the at least one satellite in the first orbital slot, such that the sets of beams servicing the interleaved sets of cells from the first orbital slot alternate in polarization;

providing for at least one set of beams from a second satellite in a second orbital slot to service at least one of the at least two interleaved sets of cells;

assigning a polarization to each set of beams from the second satellite such that the sets of beams servicing interleaved sets of cells from the second orbital slot alternate in polarization, and such that, for a set of cells serviced by two sets of beams from the first and second orbital slots, the two sets of beams are of orthogonal polarization;

providing for flexible allocation of satellite transmit power to at least one cell;

providing for flexible allocation of bandwidth and frequency to at least one cell, and providing that no two beams from a common orbital slot servicing two adjacent cells within a set of cells share a common frequency at any given time; and, reallocating satellite transmit power, bandwidth and frequency in the cells of at least one set of cells serviced from the first orbital slot, independently of the satellite transmit power, bandwidth and frequencies of the cells in other sets of cells serviced from the first orbital slot, and independently of the satellite transmit power, bandwidth and frequencies of the cells in all sets of cells serviced from the second orbital slot, in response to changes in capacity requirements in the service area.

The embodiments described herein provide in another aspect a method for accommodating changes in capacity requirements in a service area covered by at least two orbital slots, the method comprising:

subdividing the service area into at least two interleaved sets of cells;

providing for at least two sets of beams from a first satellite in a first orbital slot to service at least two of the interleaved sets of cells;

assigning a polarization to each set of beams from the at least one satellite in the first orbital slot, such that the sets of beams servicing the interleaved sets of cells from the first orbital slot alternate in polarization;

providing for at least one set of beams from a second satellite in a second orbital slot to service at least one of the at least two interleaved sets of cells;

assigning a polarization to each set of beams from the second satellite such that the sets of beams servicing interleaved sets of cells from the second orbital slot alternate in polarization, and such that, for a set of cells serviced by two sets of beams from the first and second orbital slots, the two sets of beams have the same polarization;

providing for flexible allocation of satellite transmit power to at least one cell;

providing for flexible allocation of bandwidth and frequency to at least one cell, and providing that no two beams from a common orbital slot servicing two adjacent cells within a set of cells share a common frequency at any given time; and, reallocating satellite transmit power, bandwidth and frequency in the cells of at least one set of cells serviced from the first orbital slot, independently of the satellite transmit power, bandwidth and frequencies of the cells in other sets of cells serviced from the first orbital slot, and independently of the satellite transmit power, bandwidth and frequencies of the cells in all sets of cells serviced from the second orbital slot, in response to changes in capacity requirements in the service area.

The embodiments described herein provide in another aspect, method of using a flexible frequency reuse pattern to accommodate changing capacity requirements in a satellite service area wherein the method comprises:

establishing a flexible frequency reuse pattern comprising at least two interleaved sets of co-polarized cells, wherein no two adjacent cells of a single set may share a common frequency, and wherein the polarization of each set of cells is orthogonal to the polarization of the adjacent interleaved sets of cells; and, reallocating satellite transmit power, bandwidth and frequency among the cells of at least one set, independently of the satellite transmit power, bandwidth and frequencies of other sets, in response to changes in capacity requirements in the service area.

The embodiments described herein further provide in another aspect a transmitting system for transmitting to at least a part of a set of cells within a frequency reuse pattern for a multi-beam satellite communications system, comprising:

a flexible filtering stage, having an uplink input, and a plurality of outputs for transmitting signals from the flexible filtering stage, wherein the flexible filtering stage is configured to flexibly allocate frequencies and bandwidths among the outputs;

a flexible amplification stage coupled to the outputs of the flexible filtering stage for variably amplifying the signals provided at each of the plurality of outputs; and, a plurality of co-polarized polarizing antenna feeds coupled to the flexible amplification stage for transmitting the amplified signals as beams to a co-polarized set of cells, wherein the transmitting system allocates and reallocates frequencies, bandwidths, and satellite transmit power levels among the cells of the set of cells in response to capacity requirements on the ground.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4A is a graphical representation of the intensity of an orthogonally polarized component of a polarized satellite beam along a cross-section of the polarized satellite beam;

FIG. 8C is a schematic illustration of the bandwidth of FIG. 8B as it is allocated and amplified in the exemplary transmitting system of FIG. 8A.

FIG. 8D is a schematic illustration of the bandwidth of FIG. 8B as it is reallocated and amplified in the exemplary transmitting system of FIG. 8A when an adjustment is made to the spot beam pattern.

FIG. 9C is a chart showing a summary of the possible combinations of allocations of sub-bands to the output channels of the transmitting system of FIG. 9A.

Figure 1:
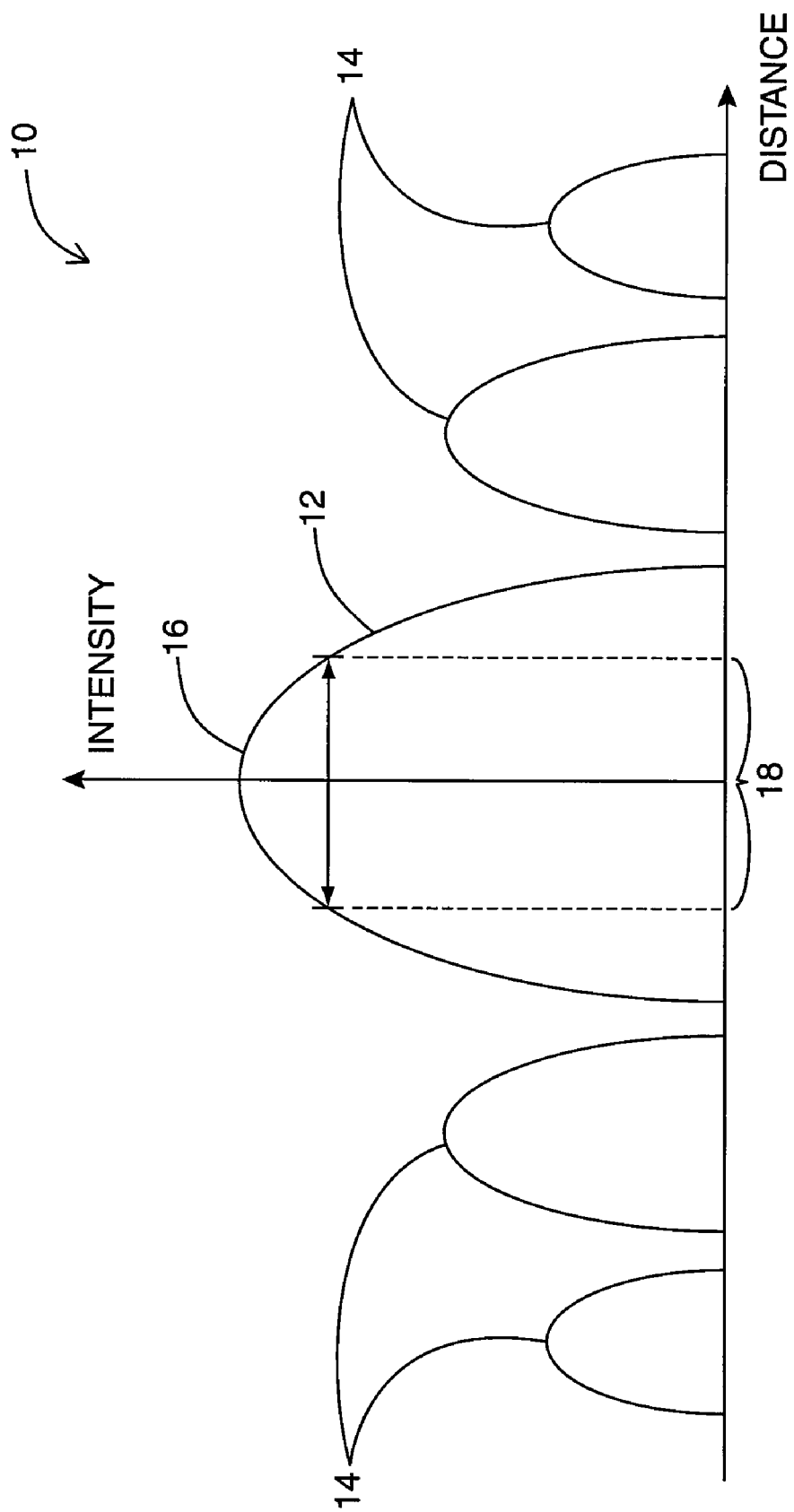
FIG. 1 is a graphical representation of the intensity of a satellite beam along a cross-section of the satellite beam.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Reference is first made to FIG. 1, which is a graphical representation of the intensity of an exemplary satellite beam 10, used in the prior art, along a cross-section of the exemplary satellite beam 10 where the x-axis is the distance on the ground from the boresite of the beam. The satellite beam 10 has a main lobe 12, and a series of side lobes 14. The intensity of the side lobes 14 is significantly lower than the intensity of the main lobe 12. The portion of the satellite beam 10 that provides the effective spot beam 18 to cover a terrestrial spot beam coverage area is the centre section 16 of the main lobe 12.

A common method of providing coverage to a service area of one or more satellites is to divide the coverage area into interleaved or adjacent cells. Often, each cell will correspond to a spot beam from a multi-beam satellite. However, in other embodiments, a cell may correspond to more than one spot beam from one or more multi-beam satellites.

Figure 2:
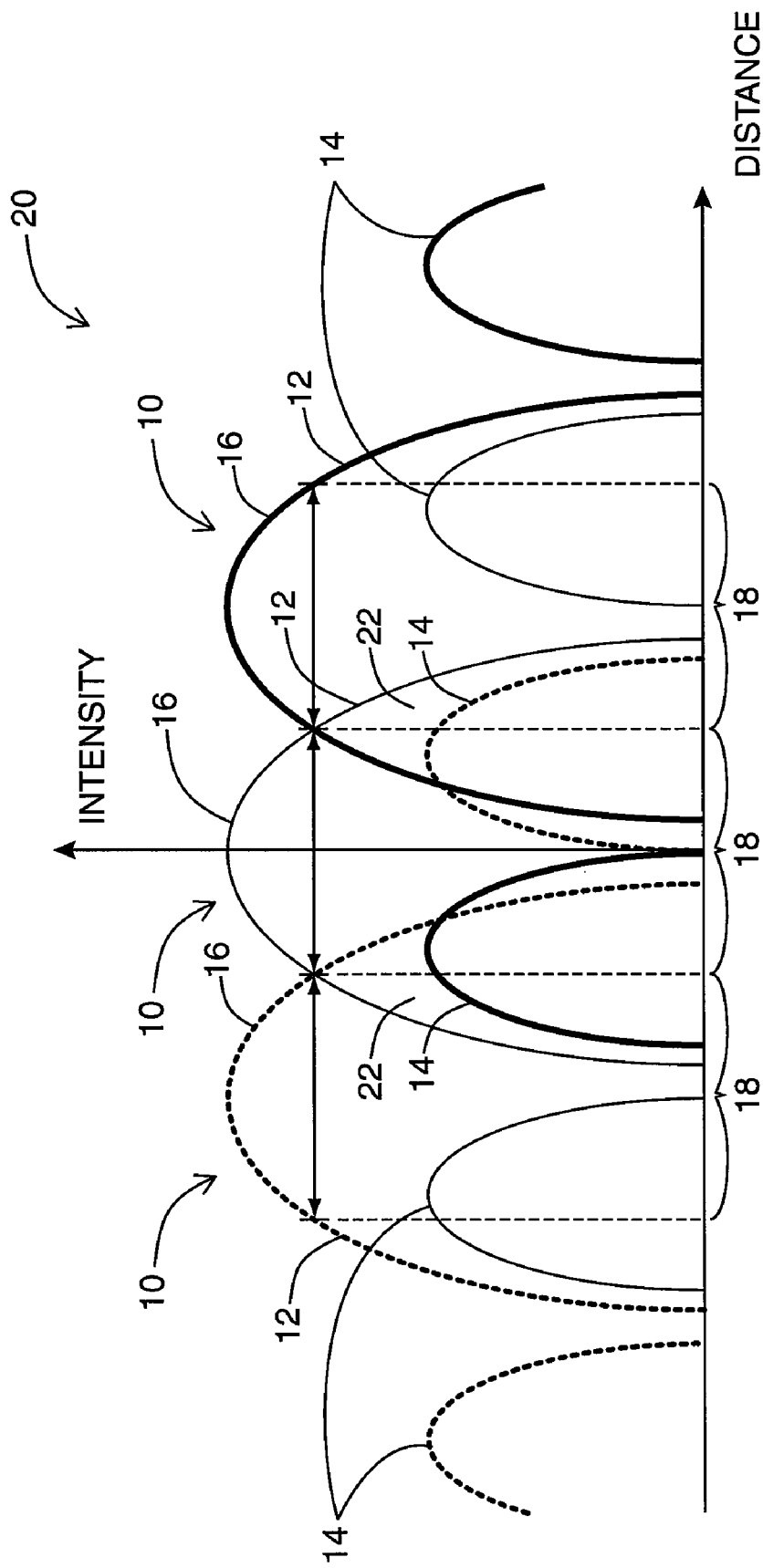
FIG. 2 is a graphical representation of the intensity of three adjacent satellite beams along a cross-section of the three adjacent satellite beams.

Reference is now made to FIG. 2, which is a graphical representation of the intensity versus distance of a cross-section of multiple adjacent satellite beams 10 in an exemplary frequency reuse pattern 20. Only the first set of side lobes 36 of each beam are shown in FIG. 2. When providing continuous coverage of the coverage area, the spot beams 18 must be interleaved or adjacent to one another. Only the centre section 16 of the main lobe 12 of each satellite beam 10 is used as the spot beam 18 forming the spot beam pattern 20, such that there is a region of overlap 22 of the main lobes 12 of adjacent satellite beams 10.

Capacity is determined from the transmission link budgets and depends on the ratio of signal to noise+interference in the link. For large multi-beam systems using high levels of frequency reuse, capacity is largely limited by interferences between beams using the same frequencies, since high frequency reuse will result in levels of interference that are significantly greater than noise levels. This is particularly true for all systems operating with adaptive coding and modulation where modulation and coding is adjusted to provide the highest spectral efficiency (which equates to the highest ratio of signal to noise+interference) and therefore maximum capacity for a given bandwidth.

Where two adjacent satellite beams 10 have a common frequency, the interference in the regions of overlap 22 of the main lobes 12 is at a level that significantly reduces capacity of the spot beams. As a result, in a typical frequency reuse pattern 20, two spot beams 18 of the same frequency are separated by at least one spot beam 18 of a different frequency. Where two spot beams 18 of the same frequency are separated by one spot beam 18 of a different frequency, the spot beams 18 still experience some interference from side lobes 14, but the relatively low intensity of the side lobes 14 limits the interference, for many purposes, to an acceptable level, and the capacity of the spot beams is not seriously compromised.

The intensity of the three satellite beams 10 shown in FIG. 2 is uniform. If there is an imbalance of power flux densities (PFD), where power flux density is used herein to refer to power/(unit bandwidth*unit area), between proximal (but not necessarily adjacent) co-frequency spot beams, then the transmit beam with the lowest PFD will be disadvantaged as it will have relatively higher interference levels from the higher PFD beams since the ratio of beam side lobe to beam peak is fixed for each beam. The capacity of the co-frequency beam with the lowest PFD will suffer due to the higher levels of interference. As a result, in a typical spot beam pattern 20 employing frequency reuse, it is of considerable importance to maintain equal PFD between beams of the same frequency. In the best case, the PFD's of proximal beams are uniform. However, limitations of components of a communications system may make exact uniformity of PFD's difficult to achieve. It is therefore important that the PFD's are substantially uniform, or as close to uniformity as can be practically achieved.

Figure 3:
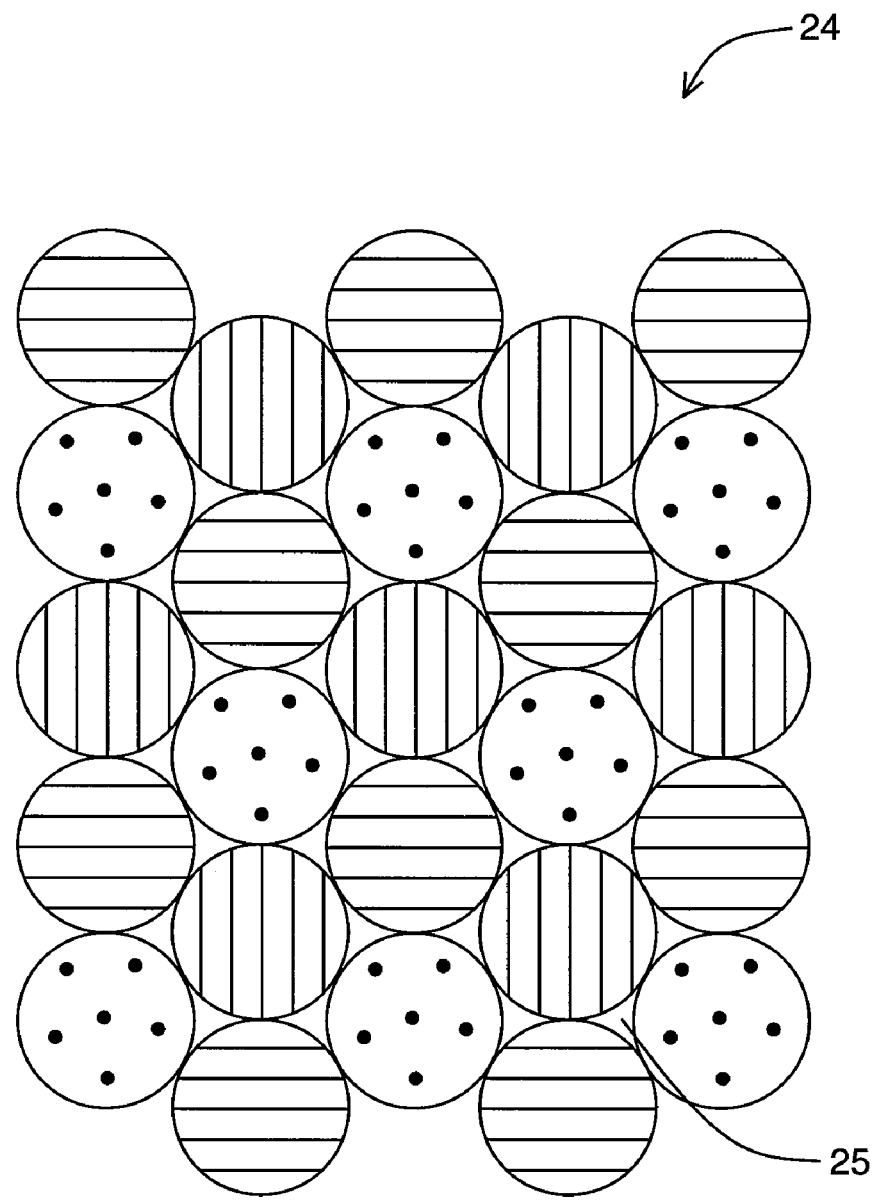
FIG. 3 is a schematic top view of an exemplary prior art satellite frequency reuse pattern.

Reference is now made to FIG. 3, which shows an exemplary prior art frequency reuse pattern 24. The cells of the exemplary prior art frequency reuse pattern 24 shown in FIG. 3 do not overlap, for clarity of illustration. However, this leaves areas 25 between cells that are not covered by a cell. In an application of the illustrated prior art frequency reuse pattern 24, the cells would overlap sufficiently to provide full coverage of the entire coverage area.

As described above with respect to FIG. 2, in order to maximize the capacity of the cells in the prior art frequency reuse pattern 24, no two cells of the same frequency and polarization are located adjacent to one another. In the prior art frequency reuse pattern 24 of FIG. 2, frequency reuse reduces the number of cell frequencies required to cover a coverage area with acceptable levels of interference to three. A cell of a first frequency 26 must be surrounded on all sides by cells of a second frequency 28 and cells of a third frequency 30. In turn, the cells of the second frequency 28 must be surrounded by cells of the first frequency 26 and cells of the third frequency 30, and cells of the third frequency 30 must be surrounded by cells of the first frequency 26 and cells of the second frequency 28.

The resulting pattern of cells 18 cannot be adjusted without causing interference problems and a resulting loss of capacity. For example, if a beam of the first frequency 26 is replaced with a beam of the second frequency 28, the beam will have unacceptable levels of interference from three adjacent beams of the same second frequency 28. In order to change the frequency of a particular cell without causing interference problems, the entire frequency pattern of the cells must be shifted, or a fourth frequency must be introduced to the prior art frequency reuse pattern 24.

Reference is now made to FIG. 4A, which shows a graphical representation of the intensity versus distance of a polarized satellite beam 32, of polarization P, produced by a pair of polarizing transmit and receive antennas, where the x-axis is the distance on the ground from the boresite of the beam. The polarized satellite beam 32 includes a polarized main lobe 34, polarized side lobes 36, and a polarized centre section 38, which acts as the effective polarized spot beam 40. The intensity of the polarized side lobes 36 is significantly lower than the intensity of the polarized main lobe 34. The polarized satellite beam 32 also includes a cross-polarized component 42, of a polarization Q, due to interference and deficiencies in polarization, transmission, and reception in the transmit and receive antennas. Polarization Q is orthogonal to polarization P. The intensity level of the cross-polarized component 42 of the satellite beam 32, which has the polarization Q, can be made significantly lower than the intensity level of the co-polarized components 34, 36, 38, which share the polarization P, without loss of aperture efficiency due to the ability of both the satellite antennas and ground-based terminals to generate beams with good cross-polarization isolation.

Figure 4B:
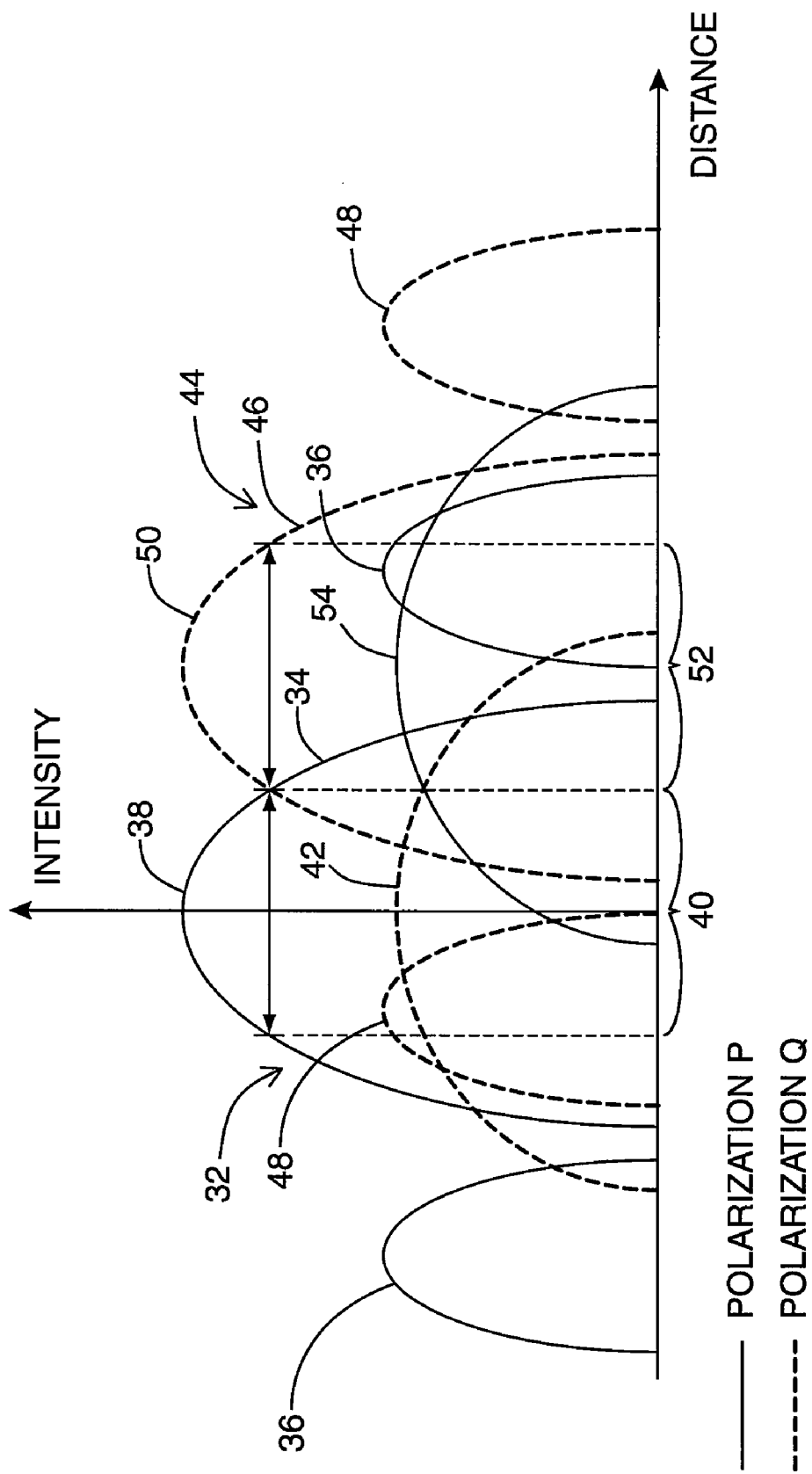
FIG. 4B is a graphical representation of the intensity of two adjacent polarized satellite beams along a cross-section of the two adjacent polarized satellite beams.

FIG. 4B shows a graphical representation of the intensity versus distance of a cross-section of the first polarized satellite beam 32 of FIG. 4A, of polarization P, adjacent to a second polarized satellite beam 44 of the same frequency as the first polarized satellite beam 32, but of the opposite polarization, Q, in a spot beam pattern. In order to provide a clearer illustration, only the first set of side lobes 36 of each beam have been included in FIG. 4B. Similarly to the first polarized satellite beam 32, the second polarized satellite beam 44 has a main lobe 46, side lobes 48, a centre section 50 of the main lobe, and a polarized effective spot beam 52.

The first polarized satellite beam 32 contains a cross-polarized component 42 of polarization Q, and the second polarized satellite beam 44 also contains a cross-polarized component 54 of polarization P. The cross-polarized component 42 of the first polarized satellite beam 32 is of the same polarization, Q, as the second polarized beam 44. Similarly, the cross-polarized component 46 of the second polarized satellite beam 44 is of the same polarization, P, as the first polarized satellite beam 32. The intensity level of the cross-polarized component of each polarized spot beam is low enough that it does not cause significant interference with the signal of the adjacent cross-polarized beam in the regions of overlap 56 between the cross-polarized component of each satellite beam with the main lobe of the adjacent polarized satellite beam. Two adjacent beams may be of a common frequency without significant interference so long as the beams are orthogonally polarized.

Figure 5A:
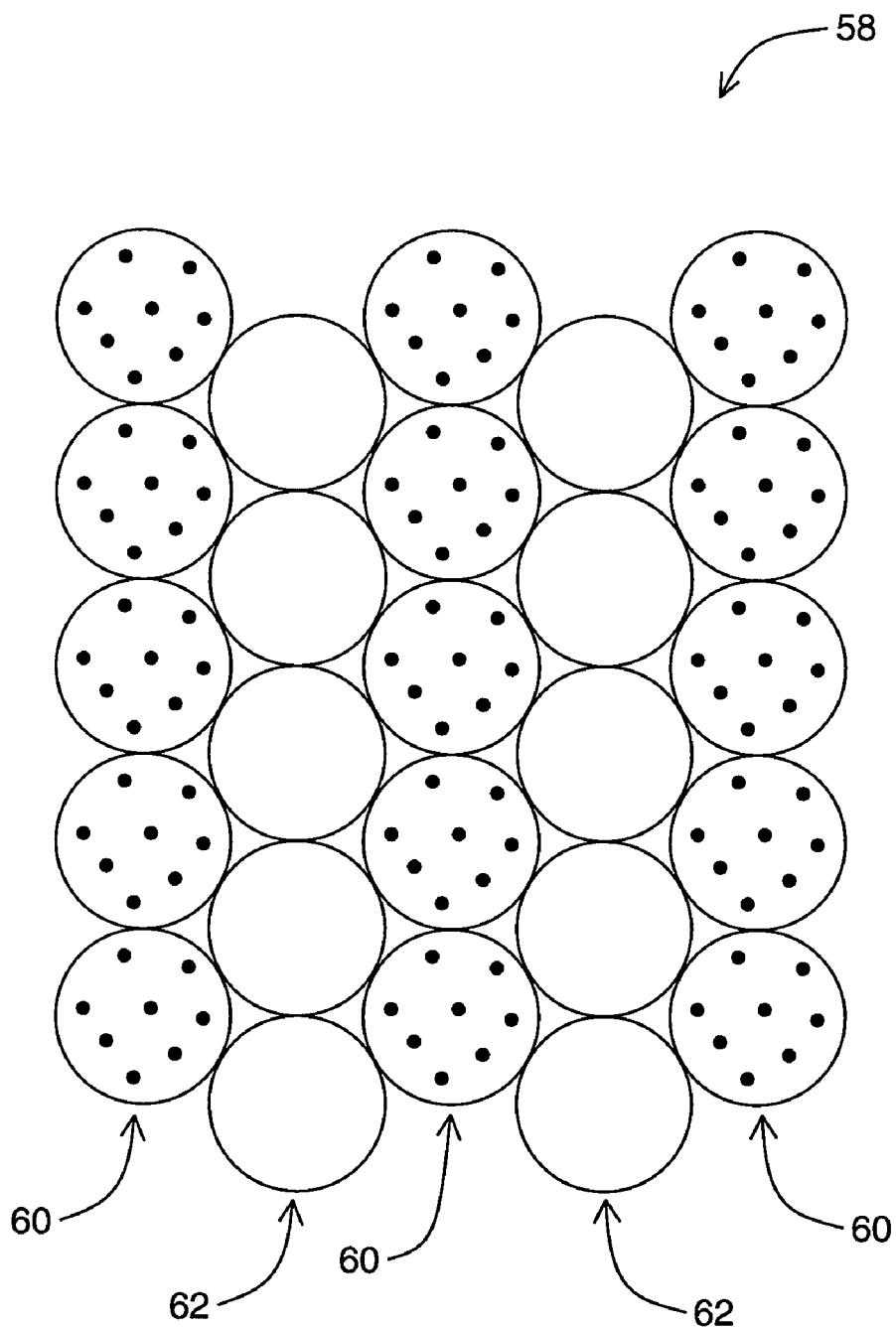
FIG. 5A is a schematic top view of an exemplary satellite frequency reuse pattern of the prior art.

Reference is made to FIG. 5A, which shows an exemplary embodiment of a frequency reuse pattern 58 for at least one multi-beam satellite known in the prior art. The frequency reuse pattern 58 is comprised of a plurality of interleaved rows of cells. Each cell may correspond to one spot beam from a multi-beam satellite. Alternatively, each cell may correspond to more than one spot beam from one or more multi-beam satellites. The cells of the exemplary prior art frequency reuse pattern 24 shown in FIG. 3 do not overlap, for clarity of illustration. However, this leaves areas 25 between cells that are not covered by a cell. In an application of the illustrated prior art frequency reuse pattern 24, the cells would overlap sufficiently to provide full coverage of the entire coverage area.

The rows comprise a first type of row 60 in which every cell in the row has first polarization, P, and a second type of row 62 in which every cell in the row has a second polarization, Q. The first and second polarizations, P and Q, are orthogonal polarizations. The frequency reuse pattern 58 shown in FIG. 5A consists of five rows of five cells. However, it will be appreciated by those skilled in the art that the frequency reuse pattern 58 may be made arbitrarily large by adding additional cells to the pattern, limited only by the requirement that the rows of the frequency reuse pattern 58 alternate in polarization.

Figure 5B:
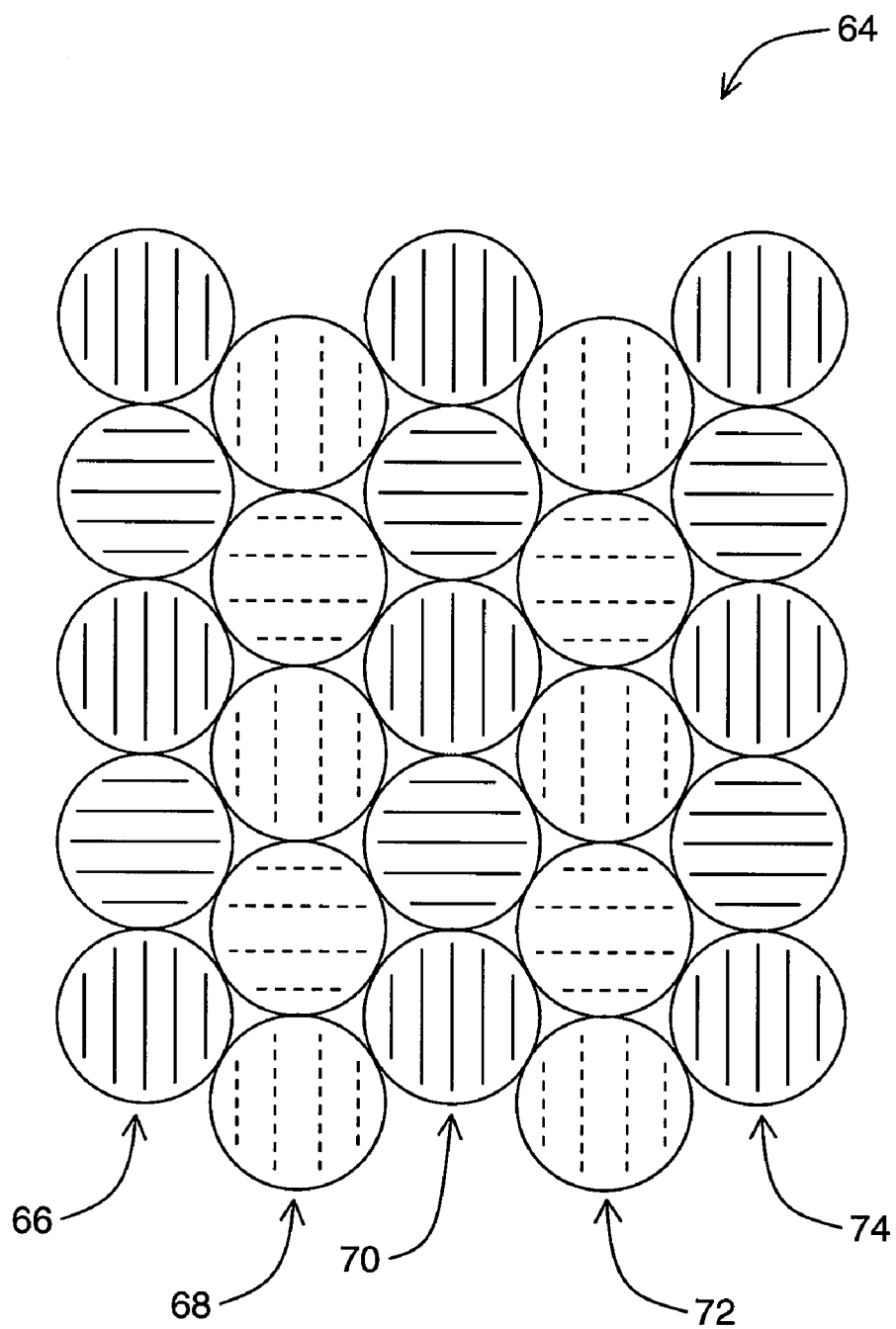
FIG. 5B is a schematic top view of an alternative exemplary satellite frequency reuse pattern of the prior art.

Reference is now made to FIG. 5B, which shows an exemplary embodiment of a frequency reuse pattern 64 of the prior art for at least one multi-beam satellite, in which frequency reuse is maximized without compromising the capacity of each cell, as is known in the prior art. In the frequency reuse pattern of FIG. 5B, the number of frequencies required to cover a coverage area without a significant loss of capacity due to interference between cells is reduced to two frequencies. The frequency reuse pattern 64 of FIG. 5 comprises five interleaved rows 66, 68, 70, 72, 74 of cells. Each row 66, 68, 70, 72, 74 is composed of five cells having a common polarization. The rows 66, 68, 70, 72, 74 alternate in polarization. The cells 76, 78 in the first row 66, third row 70 and fifth row 74 of beams have a first polarization. The cells 80, 82 in the second row 68 and fourth row 72 have a second, orthogonal polarization.

Each cell in the frequency reuse pattern 64 is of one of two frequencies, and is polarized in one of the two possible orthogonal polarizations. This produces a first type of cell 76 of a first frequency and a first polarization, a second type of cell 80 of the first frequency and a second polarization 80, where the second polarization is orthogonal to the first polarization, a third type of cell 78 of a second frequency and the first polarization, and a fourth type of cell 82 of the second frequency and the second polarization.

The cells 76, 78, 80, 82 are assigned to a row according to the polarization of the row and the cell. Within each co-polarized row 66, 68, 70, 72, 74, the cells are arranged in alternating frequencies. For example, in the first row 66, the cells alternate between the first type of cell 76, of the first frequency and first polarization, and the third type of cell 78, of the second frequency and the first polarization. In the next row in the frequency reuse pattern 64, the second row 68, the cells alternate between the second type of cell 80, of the first frequency and the second polarization, and the fourth type of cell 82, of the second frequency and the second polarization. This pattern is repeated in the remaining rows 70, 72, 74.

As described with respect to FIG. 4B, two adjacent cells in the frequency reuse patterns shown in FIGS. 5A and 5B with opposite polarizations may share a frequency without significant interference. This means that the frequencies of the cells in a given co-polarized row are independent of the frequencies of the cells in the adjacent cross-polarized row.

Figure 6A:
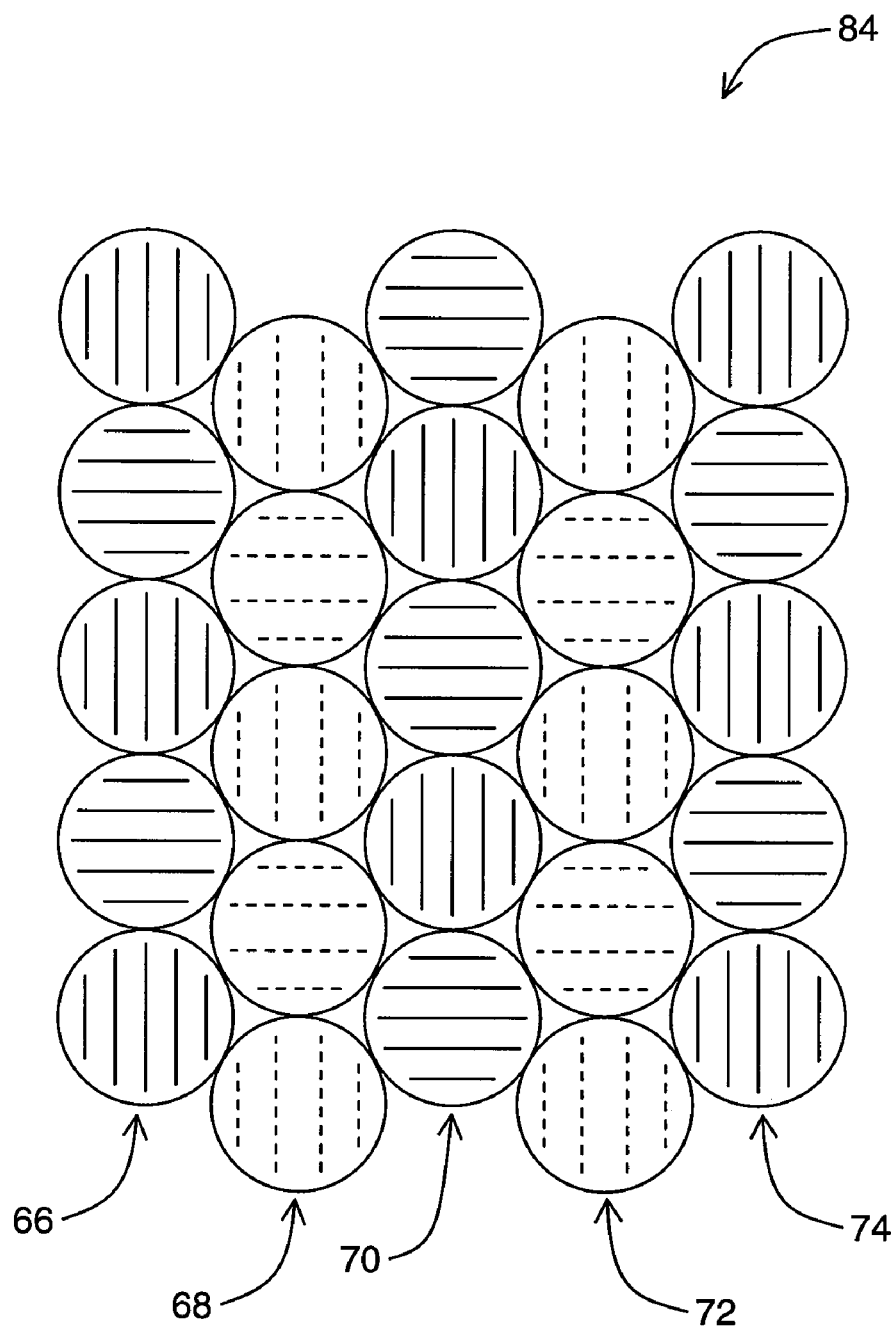
FIG. 6A is a schematic top view of an exemplary adjustment of the satellite frequency reuse pattern of FIG. 5B.

Reference is now made to FIG. 6A, which shows an exemplary adjustment 84 of the frequency reuse pattern 64 of FIG. 5B in an exemplary embodiment of the present invention. The adjustment 84 of the frequency reuse pattern 64 may be made while the satellite is in orbit. In FIG. 6A, the frequency of a cell 85 in the third row 70 has been switched from the first frequency to the second frequency without changing the polarization of the cell, so that the cell at that location has been changed from the first type of cell 76 to the third type of cell 78. In order to comply with the requirement for reduced interference that two adjacent cells may not share a common frequency and polarization, the frequencies of the other cells in the third row 70 have also been adjusted. The polarization of the cells in the third row 70 have not been changed. In contrast to the prior art, the distribution of frequency over the cells in all of the other rows 66, 68, 72, 74 of the frequency reuse pattern 84 is not affected by the changes in the third row 70.

Although the PFD's of the cells are not shown in FIG. 6A, where power flux density is used herein to refer to power/(unit bandwidth*unit area), the PFD's of proximal cells of the same type are substantially uniform. Each change in type of a given cell is therefore accompanied by an adjustment of the satellite transmit power in the beam to that cell to maintain PFD and prevent a loss of capacity to proximal cells of the same type.

The frequency reuse pattern 84 shown in FIG. 6A consists of five rows of five cells. However, it will be appreciated by those skilled in the art that the frequency reuse pattern 84 may be made arbitrarily large by adding additional cells to the pattern, limited only by the requirement that the rows of the frequency reuse pattern 84 alternate in polarization, and that the cells within each row alternate in frequency.

It will be appreciated by those skilled in the art that the exemplary adjustment 84 shown in FIG. 6A of the frequency reuse pattern 64 of FIG. 5B is one of a multitude of patterns that may be created by switching the frequencies and satellite transmit powers of the cells in the frequency reuse pattern 64. The only limitations on switching the types of the cells are that no two cells of the same type may be adjacent; the frequencies of the cells in each co-polarized row must alternate, and the polarizations of the rows of cells must also alternate. In addition, the satellite transmit power to the switched beams should be adjusted to ensure PFD is relatively unchanged so that proximal cells of the same type do not lose capacity through interference. The frequency reuse pattern 64 can be adjusted to accommodate capacity requirements on the ground by moving frequencies and satellite transmit power along each co-polarized row of cells, without restrictions from the frequencies of and satellite transmit power to the cells in the adjacent cross-polarized rows.

Figure 6B:
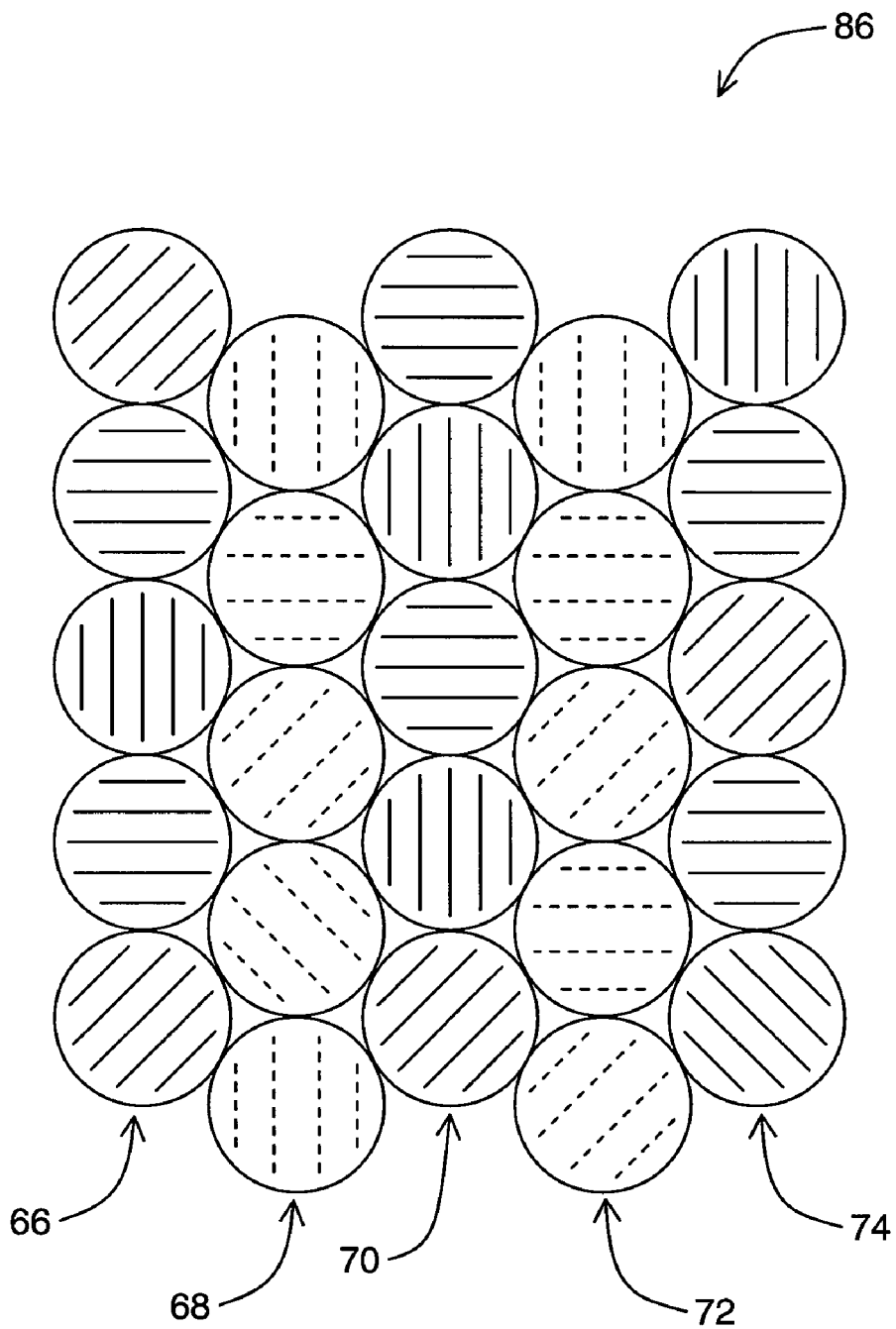
FIG. 6B is a schematic top view of another exemplary adjustment of the satellite frequency reuse pattern of FIG. 5B.

Reference is now made to FIG. 6B, which shows an exemplary alternative adjustment 86 of frequency reuse pattern 64 of FIG. 5B. The alternative adjustment 86 of the frequency reuse pattern 64 may be made while the satellite is in orbit, in order to adjust to capacity requirements on the ground. In FIG. 6B, many of the cells have been switched from the first frequency to the second frequency, or from the second frequency to the first frequency without changing the polarization of the cell in question, resulting in a switch in type of beam from the first type of cell 76 to the second type of cell 78 or vice versa, or from the third type of cell 80 to the fourth type of cell 82 or vice versa. In addition, the frequency or bandwidth of some of the cells has been switched to a third frequency and/or bandwidth, or a fourth frequency and/or bandwidth. The additional frequencies and bandwidths have resulted in a fifth type of cell 88, of a third frequency and the first polarization, a sixth type of cell 90, of the third frequency and the second polarization, a seventh type of cell 94, of a fourth frequency and the first polarization, and an eighth type of cell 92, of the fourth frequency and the second polarization. None of the cells have changed polarization.

The resulting frequency reuse pattern 86 has been significantly changed from the original frequency reuse pattern shown in FIG. 5B. However, as with the pattern shown in FIG. 5B, each of the cells in the rows of cells 66, 68, 70, 72, 74 is polarized, with the first row 66, third row 70 and fifth row 74 of a common first polarization, and the second row 68 and the fourth row 72 of a common polarization orthogonal to the first polarization. Within each of the rows 66, 68, 70, 72, 74 no two adjacent cells are of a common frequency.

Although the PFD's of the cells are not shown in FIG. 6B, the PFD's of proximal cells of the same type are substantially uniform. Each change in type of a given cell is therefore accompanied by an adjustment of the satellite transmit power in the beam to that cell to maintain PFD levels and prevent a loss of capacity to proximal beams having the same frequency.

The frequency reuse pattern 86 shown in FIG. 6B consists of five rows of five cells. However, it will be appreciated by those skilled in the art that the frequency reuse pattern 86 may be made arbitrarily large by adding additional cells to the pattern, limited only by the requirement that the rows of the frequency reuse pattern 86 alternate in polarization, that the cells within each row alternate in frequency, and that the PFD's of proximal cells of the same type are substantially uniform.

It will be appreciated by those skilled in the art that the frequency reuse pattern 86 shown in FIG. 6B is one of a multitude of patterns that may be created by switching the frequencies, bandwidths and satellite transmit power of the cells in the frequency reuse pattern according to the requirements for reducing interference and maximizing capacity as described above. The frequency reuse pattern 64 can be adjusted to accommodate capacity requirements on the ground by moving frequencies, bandwidth and satellite transmit power between the cells within each co-polarized row of cells, without restrictions from the frequencies used in and power transmitted to the cells in the adjacent cross-polarized rows.

The frequency reuse patterns of FIGS. 6A and 6B consist of interleaved rows. However, the principles of operation of the frequency reuse patterns may be generalized to a much broader set of constraints, of which the above-described patterns are one embodiment, providing for highly flexible frequency reuse patterns that may be adjusted in-orbit to accommodate changing capacity requirements on the ground. Specifically, the frequency reuse pattern may be broadly defined by subdividing the service area into at least two interleaved sets of cells, wherein the cells from different sets are interleaved. In addition, no two adjacent cells within a given set of cells may share a common frequency at any given time. In the above examples, the interleaved sets of cells are the rows of cells, but numerous configurations of interleaved sets of cells may comply with the above definition. Frequency reuse is maximized by any configuration in which each cell within a set of cells is adjacent to a maximum of two other cells from that set.

The frequency reuse pattern is further broadly defined by requiring that each set of cells is assigned one of two orthogonal polarizations, and that adjacent sets of cells alternate in polarization. Finally, each satellite beam servicing each cell has flexible frequency, bandwidth and satellite transmit power.

In a frequency reuse pattern broadly defined according to the above limitations, changing capacity requirements in the service area may be accommodated by providing that the allocation of bandwidth, frequency and satellite transmit power from a satellite beam service each cell is flexible. According to this definition, flexible allocation of bandwidth, flexible allocation of frequency, and flexible allocation of satellite transmit power are defined as allocations that can be changed one orbit according to commands, permitting real-location of bandwidth, frequency and satellite transmit power, allowing the movement of satellite transmit power, frequency, and bandwidth around within each set of cells. The reallocation of satellite transmit power, frequency and bandwidth within each set of cells is unconstrained by the satellite transmit power, frequencies, and bandwidths of the cells of the other sets of cells, due to the orthogonal polarization.

Figure 7A:
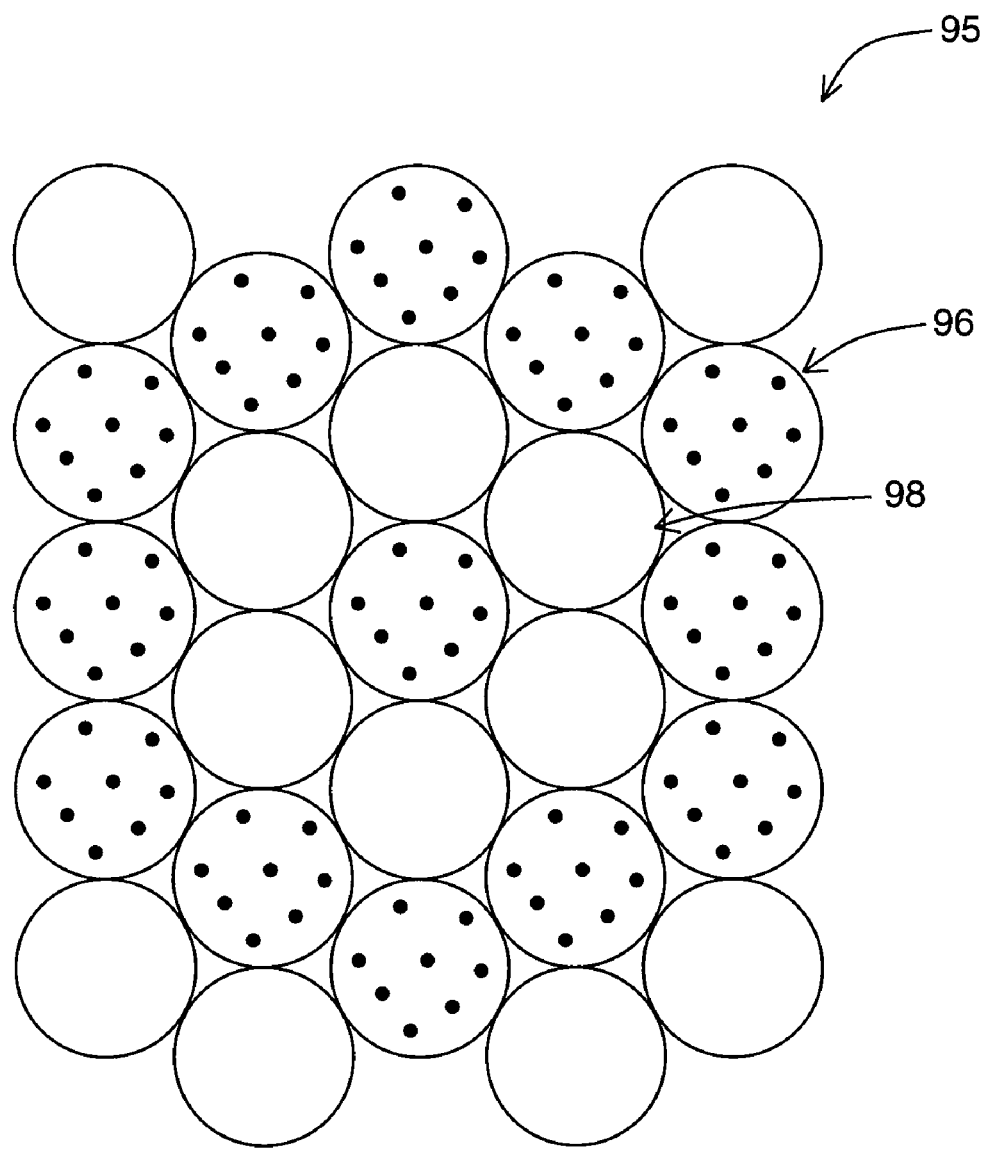
FIG. 7A is a schematic top view of an alternative frequency reuse pattern.
Figure 7B:
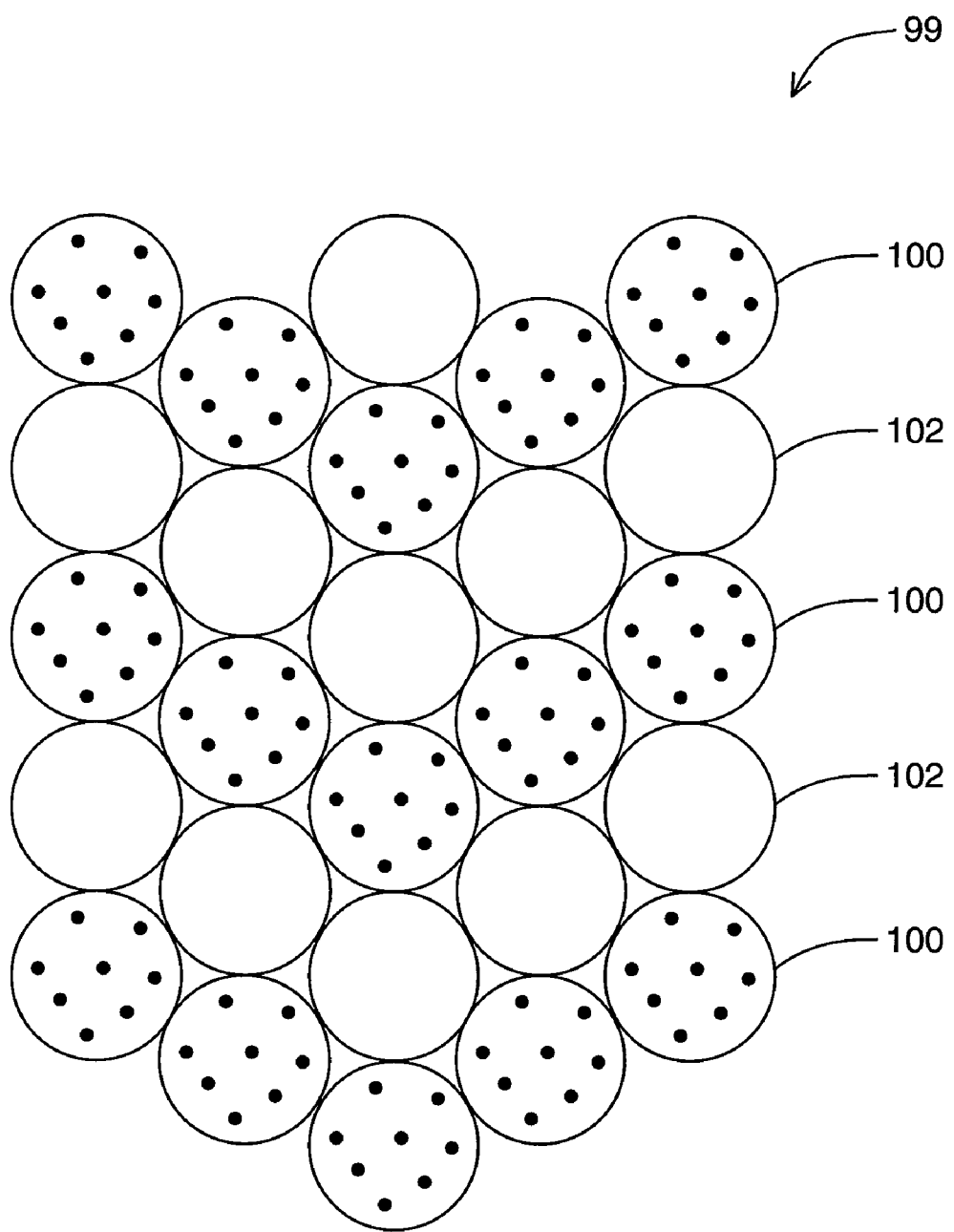
FIG. 7B is a schematic top view of another alternative frequency reuse pattern.
Figure 7C:
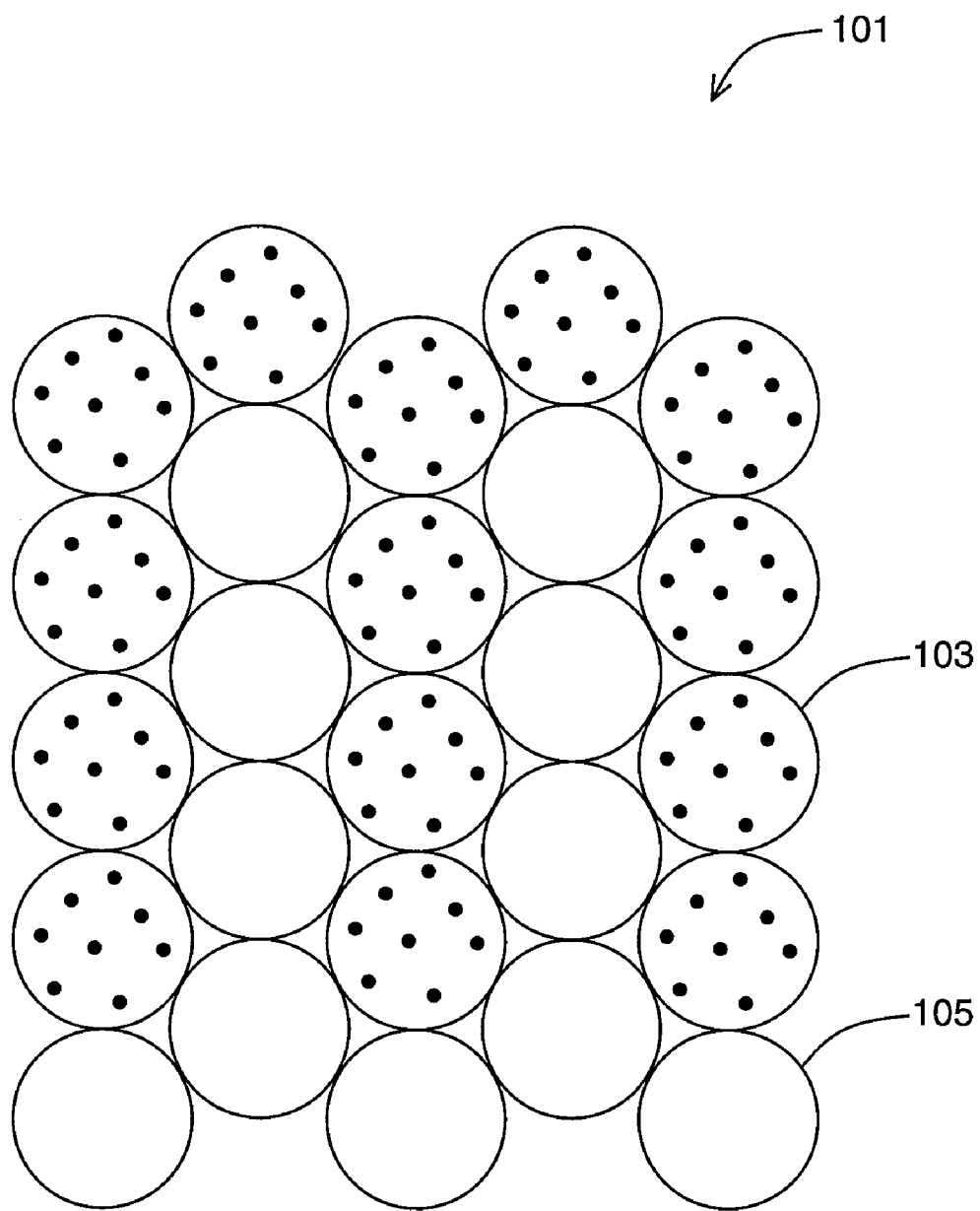
FIG. 7C is a schematic top view of another alternative frequency reuse pattern.

For optimal performance, the power transmitted to each cell is adjusted as frequencies are reallocated, in order to maintain a substantially uniform PFD among proximal cells having the same frequency and polarization. Reference is made to FIGS. 7A, 7B and 7C, which show three examples of alternative cell patterns which may be substituted for a pattern of interleaved rows of alternating polarization while still complying with the broad requirements described above.

FIG. 7A shows a schematic top view of an exemplary alternative frequency reuse pattern 95 of interleaved sets of cells forming concentric rings 96, 98 of cells, wherein the rings 96, 98 alternate in polarization. The frequency reuse pattern 95 of FIG. 7A can be adjusted to accommodate capacity requirements on the ground by moving frequencies and satellite transmit power around each concentric circle of cells, without restrictions from the frequencies and satellite transmit power of the cells in the adjacent cross-polarized concentric circles.

Similarly, FIG. 7B shows a schematic top view of another exemplary alternative frequency reuse pattern 99 of sets of cells forming chevrons 100, 102 of cells, wherein the chevrons alternate in polarization. The frequency reuse pattern of FIG. 7B can be adjusted to accommodate capacity requirements on the ground by moving frequencies and satellite transmit power within each interleaved chevron 100, 102 of cells, without restrictions from the frequencies used in and power transmitted to the cells in the adjacent cross-polarized chevrons.

Similarly, FIG. 7C shows a schematic top view of another exemplary alternative frequency reuse pattern 101 that requires only a first set of cells 103 and a second set of cells 105 covering the entire service area. The exemplary frequency reuse pattern 101 comprises a first set of cells 103 having a number of generally parallel arms. A second set of cells 105 has a similar shape having a number of generally parallel arms. The arms of the first set of cells 103 are inter-digitized with the arms of the second set of cells 105. The first set of cells 103 has a polarization that is orthogonal to the polarization of the second set of cells 105. The satellite transmit power, frequency and bandwidth can be moved across a large area of the service coverage in a set of cells, without restrictions from the frequencies used in and power transmitted to the cells of the other set.

It will be appreciated by those skilled in the art that the frequency reuse patterns of the present invention are not restricted to the patterns shown in FIGS. 7A, 7B and 7C, but may be expanded to other patterns that can be adjusted according to the same principles.

It will furthermore be appreciated by those skilled in the art that the frequency reuse patterns of the present invention may be projected by one multi-beam satellite, or by more than one multi-beam satellite. Each cell may correspond to one spot beam, or to more than one spot beam. In the second case, the more than one spot beam may originate at one or at more than one satellite. In addition to reallocating frequency, bandwidth and satellite transmit power among the cells of the frequency reuse pattern while the satellite(s) are in orbit, the number of satellites may be changed. For example, in one case, the frequency reuse pattern could initially be projected by just one satellite, and a second satellite may be subsequently launched. The addition of the second satellite may increase the capacity of the cells, or may increase the number of cells, or both.

Figure 8A:
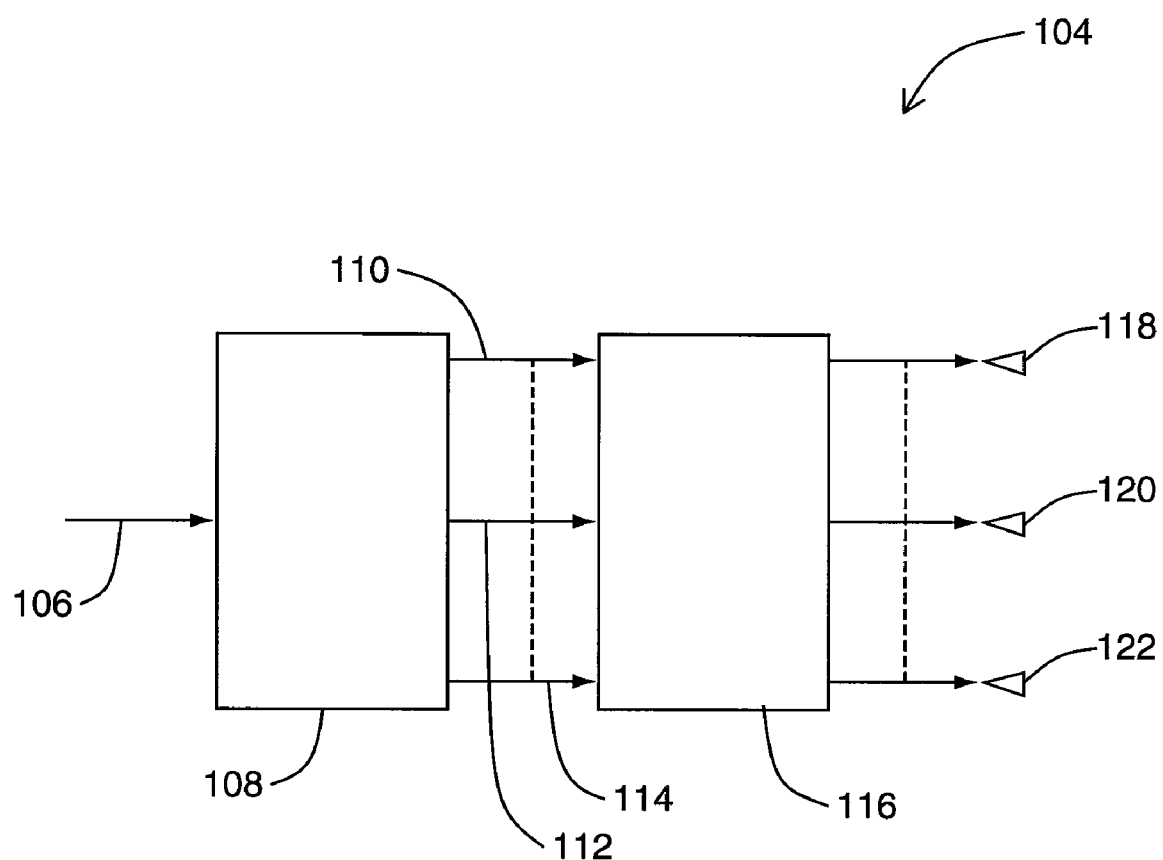
FIG. 8A is a schematic illustration of an exemplary transmitting system for transmitting a co-polarized set of cells in a frequency re-use pattern.

FIG. 8A shows a schematic illustration of an exemplary generic transmitting system 104 for transmitting to a co-polarized set of cells of the frequency reuse pattern shown in any of FIGS. 5A-7C from a single satellite where each cell corresponds to one beam. The system comprises a common uplink channel 106, which transmits a broad bandwidth of uplink channels to a flexible filtering stage 108. At the flexible filtering stage 108, the uplink channels are separated into sub-bands of the available bandwidth of the uplink channel. The sub-bands are allocated among a first downlink channel 110, a second downlink channel 112, and a third downlink channel 114, where each downlink channel 110, 112, 114 comprises at least one sub-band of the bandwidth of the uplink channel 106. The downlink channels 110, 112, 114 are then transmitted to a flexible amplification stage 116. At the flexible amplification stage 116, the signals of each downlink channel 110, 112, 114 are amplified to provide gain to each signal. The amplified downlink channels are each respectively transmitted to one of a first polarizing antenna feed 118, a second antenna feed 120 and a third polarizing antenna feed 122, where each polarizing antenna feed 118, 120, 122 corresponds to a beam servicing one cell in a set of co-polarized cells on the ground.

It will be understood by those skilled in the art that, while the generic transmitting system 104 of FIG. 8A comprises only three downlink channels 110, 112, 114, and three corresponding polarizing antenna feeds 118, 120, 122, this is for the purpose of illustration only. A transmitting system may have any number of downlink channels and antenna feeds, without departing from the spirit of the invention.

It will be understood by those skilled in the art that the transmitting system 104 shown in FIG. 8A produces one co-polarized set of beams servicing a set of cells in a frequency reuse pattern. A multi-beam communications system in at least one embodiment of the present invention may require more than one transmitting system 104 to produce a frequency reuse pattern comprising a plurality of beams servicing interleaved sets of cells of alternating polarization. The multi-beam communications system may require one or more transmitting systems 104 per co-polarized set of the frequency reuse pattern. Since the frequency and satellite transmit power adjustments in a co-polarized set of the pattern are independent of the frequency and satellite transmit power adjustments of the other sets, the more than one transmitting systems 104 work in parallel, but essentially independently of one another, to provide the entire frequency reuse pattern.

Figure 8B:
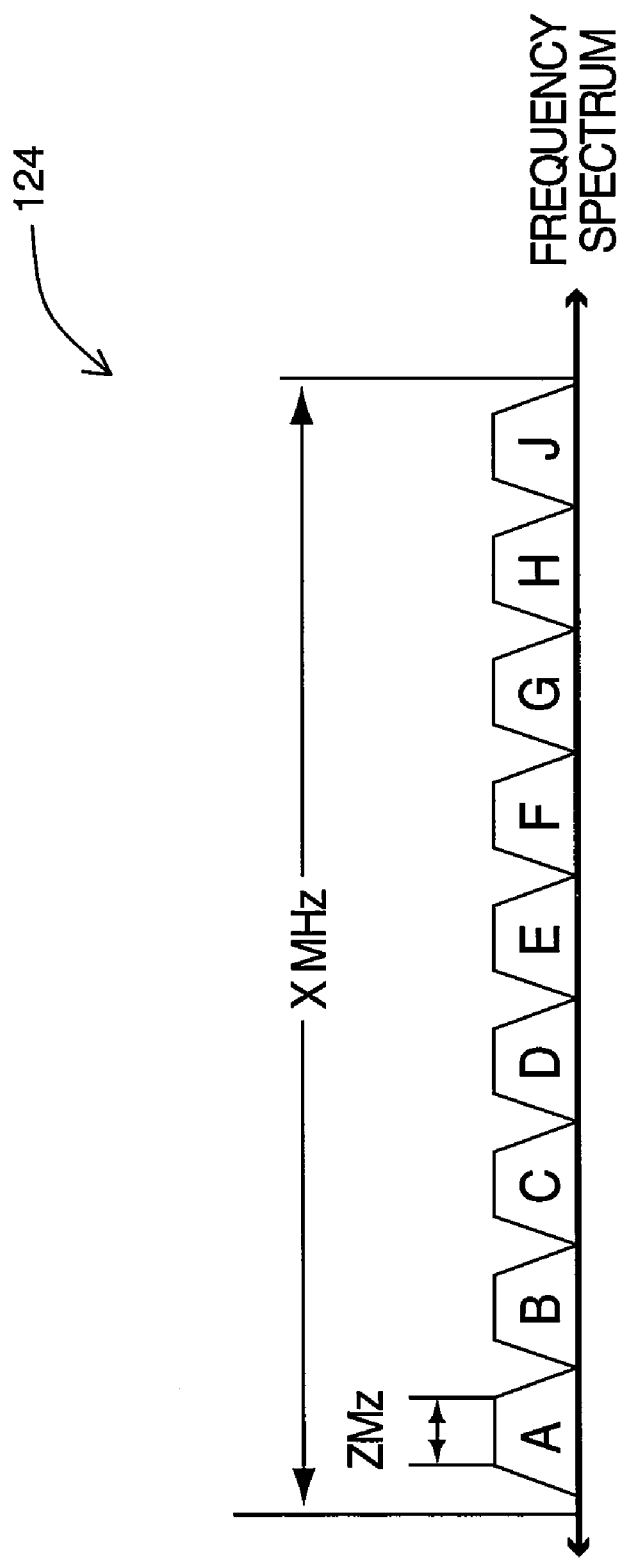
FIG. 8B is a schematic illustration of the bandwidth available to the exemplary transmitting system of FIG. 8A.

Reference is now made to FIG. 8B, which shows a schematic illustration of the bandwidth 124 available to a generic transmitting system 104. The available bandwidth spans X MHz. The available bandwidth is divided into nine sub-bands A, B, C, D, E, F, G, H, J of the bandwidth, where each sub-band spans Z MHz. As described above, the sub-bands A, B, C, D, E, F, G, H, J are allocated among the cells at the flexible filtering stage of the generic transmitting system in order to allocate a desired capacity to each of the cells in a given co-polarized set. It will be understood by those skilled in the art that, while the number of sub-bands of the available bandwidth in FIG. 8B is nine, this is for the purpose of illustration only. The available bandwidth may be divided into any number of sub-bands, without departing from the spirit of the invention.

Reference is now made to FIG. 8C, which shows a schematic illustration of the bandwidth 124 as it is allocated and amplified in a generic transmitting system. The common uplink channel transmits a broad bandwidth 124 of uplink channels to a flexible filtering stage 108. At the flexible filtering stage, the sub-bands A, B, C, D, E, F, G, H, J of the available bandwidth are allocated to the three downlink channels 110, 112, 114, where a first three sub-bands A, B, C are allocated to the first downlink channel 110, a fourth sub-band D is allocated to the second downlink channel 112, and the remaining five sub-bands E, F, G, H, J are allocated to the third downlink channel 114. The amplifying stage 116 results in a gain to each of the sub-bands A, B, C, D, E, F, G, H, J.

Reference is now made to FIG. 8D, which shows a schematic illustration of the bandwidth 124 as it is reallocated and amplified in a generic transmitting system, after the frequency reuse pattern of the beams servicing a co-polarized set of cells shown in FIG. 8C has been adjusted to reallocate capacity among the cells within the set. At the flexible filtering stage 108, the sub-bands A, B, C, D, E, F, G, H, J of the available bandwidth are reallocated to the three downlink channels 110, 112, 114, such that the first two sub-bands A, B, are allocated to the first downlink channel 110, the third through the sixth sub-bands C, D, E, F are allocated to the second downlink channel 112, and the remaining three sub-bands G, H, I are allocated to the third downlink channel 114. The amplifying stage results in a gain to each of the sub-bands A, B, C, D, E, F, G, H, J.

Figure 9A:
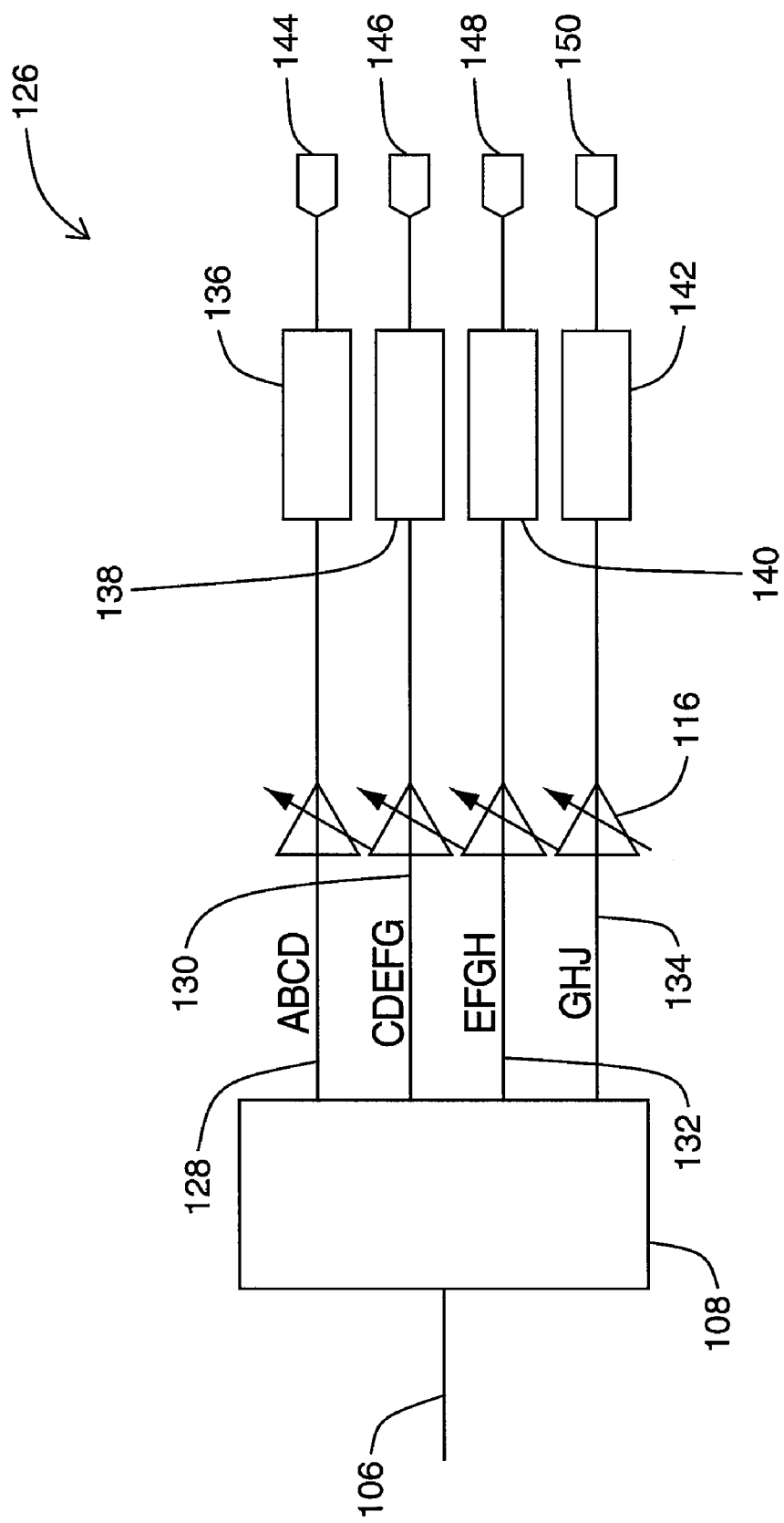
FIG. 9A is a schematic illustration of another exemplary transmitting system for transmitting a co-polarized set of cells in a frequency re-use pattern.

Reference is now made to FIG. 9A, which shows another embodiment of a transmitting system 126 for transmitting beams to a co-polarized set of cells of the frequency reuse pattern shown in any of FIGS. 5A-7C from a single multi-beam satellite where each cell corresponds to one beam. The system comprises a common uplink channel 106, which transmits the broad bandwidth 124 uplink channels of FIG. 8B to a flexible filtering stage 108. At the flexible filtering stage, the uplink channels are separated into the sub-bands, A to J, of FIG. 8B. The sub-bands A, B, C, D, E, F, G, H, J are allocated among a first downlink channel 128, a second downlink channel 130, a third downlink channel 132, and a fourth downlink channel 134, where each downlink channel 128, 130, 132, 134 comprises at least one sub-band of the bandwidth 124 of the uplink channel 106.

In the transmitting system of FIG. 9A, the flexible filtering stage 108 can transmit any of the four sub-bands A to D to the first downlink channel 128. The flexible filtering stage 108 can transmit any of the five sub-bands C to G to the second downlink channel 130, can transmit any of the four sub-bands E to H to the third downlink channel 132, and can transmit any of the three sub-bands G to J to the fourth downlink channel 134. However, the flexible filtering stage 108 may not transmit a particular sub-band to more than one downlink channel.

The downlink channels are then transmitted to a flexible amplification stage 116. At the flexible amplification stage 116, the sub-bands of each downlink channel 128, 130, 132, 134 are amplified to provide a gain to each signal. The amplified downlink channels are each respectively filtered by a wide-band output filter 136, 138, 140, 142, then transmitted to one of a first polarizing antenna feed 144, a second antenna feed 146, a third polarizing antenna feed 148, and a fourth polarizing antenna feed 150, where each polarizing antenna feed 144, 146, 148, 150 corresponds to a beam servicing one cell in a set of co-polarized cells on the ground.

Figure 9B:
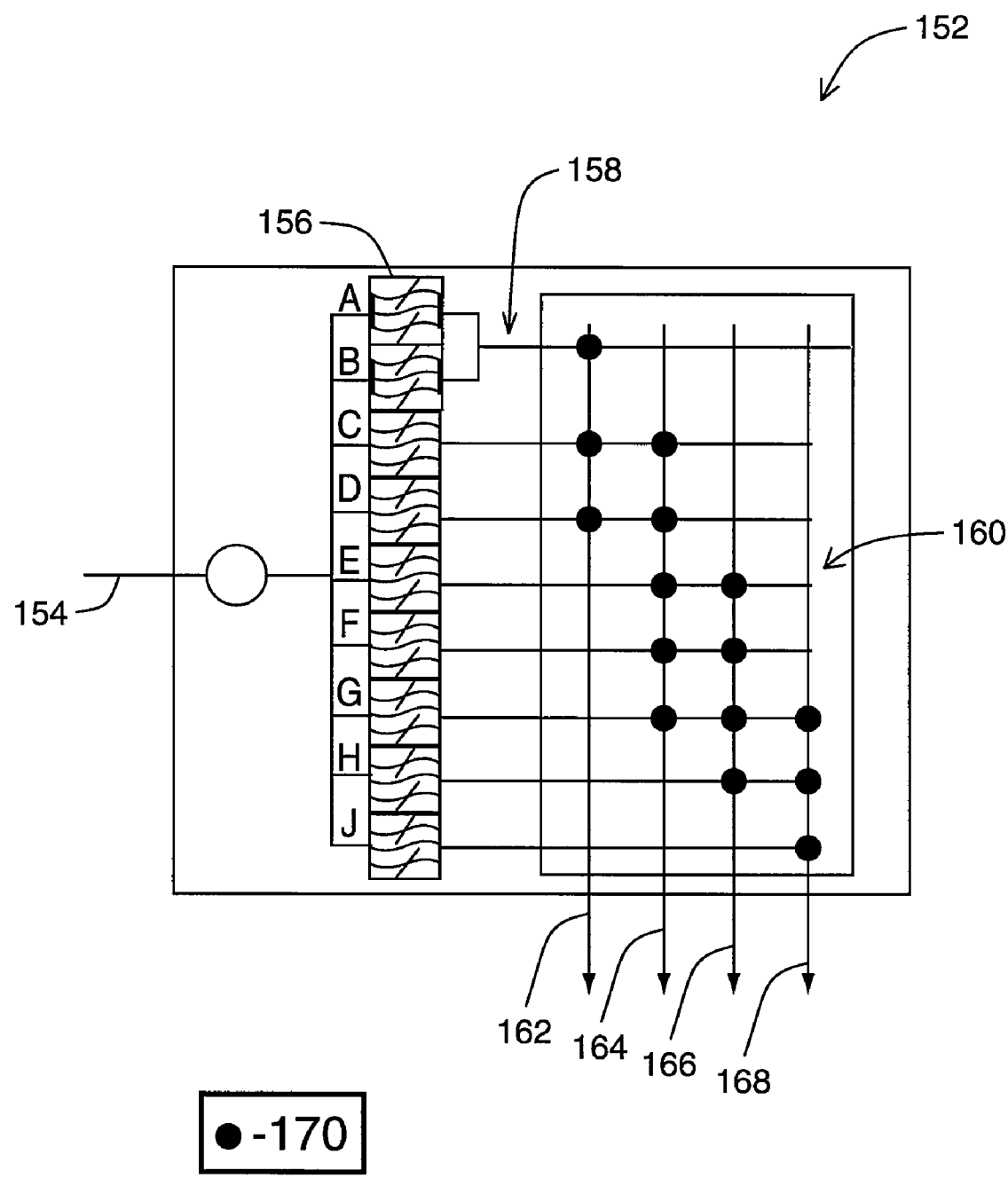
FIG. 9B is a schematic illustration of an exemplary flexible channelization filtering and switching unit that may be used at the flexible filtering stage of FIG. 9A.

Reference is now made to FIG. 9B, which shows an exemplary flexible channelization filtering and switching unit 152 that may be used at the flexible filtering stage 108 of the transmitting system 126 of FIG. 9A. The flexible channelization filtering and switching unit 152 comprises a filter input 154 that receives the common uplink channel. The flexible channelization filtering and switching unit 152 comprises a bank of nine individual waveguide cavity filters 156, wherein each of the nine waveguide cavity filters 156 corresponds to one of the nine sub-bands A, B, C, D, E, F, G, H, J of the available bandwidth 124. The waveguide cavity filters 156 each have a waveguide cavity output 158, which transmits the filtered signal of the corresponding sub-band to a switch matrix 160. The switch matrix 160 has four matrix outputs 162, 164, 166, 168, wherein each of the four matrix outputs 162 corresponds to one of the four downlink channels 128, 130, 132, 134 of the transmitting system 126.

Each of the waveguide cavity outputs 158 connects to a node 170 on at least one of the four matrix outputs 162, 164, 166, 168. The nodes 170 determine which of the sub-bands A, B, C, D, E, F, G, H, J may be allocated to a given output channel 162, 164, 166, 168. For example, in the transmitting system 126 of FIG. 9A, only the first downlink channel 128 may be allocated the A sub-band and the B sub-band. Therefore, the waveguide cavity outputs 158 corresponding to the A sub-band and the B sub-band share a common node 170 on the first matrix output 162, which corresponds to the first downlink channel 128. The waveguide cavity output 158 corresponding to the G sub-band has nodes on the second 164, third 166 and fourth 168 matrix outputs, such that the G sub-band may be allocated to any one of the second 130, third 132 or fourth 134 downlink channel.

Reference is now made to FIG. 9C, which is a chart showing a summary of the possible combinations of allocations of sub-bands to the four output channels of the transmitting system of FIG. 9A. The transmitting system may adjust the frequency reuse pattern on the ground in order to flexibly allocate capacity among the cells of a co-polarized set by switching from one combination of allocations shown in the chart of FIG. 9C to another combination of allocations. The chart of FIG. 9C demonstrates the degree of flexibility in allocating frequency among the cells in a co-polarized set that is achievable in an exemplary transmitting system of the present invention. It will be understood by those skilled in the art that the limitations of the transmitting system and the corresponding chart may be changed in other embodiments.

Figure 10A:
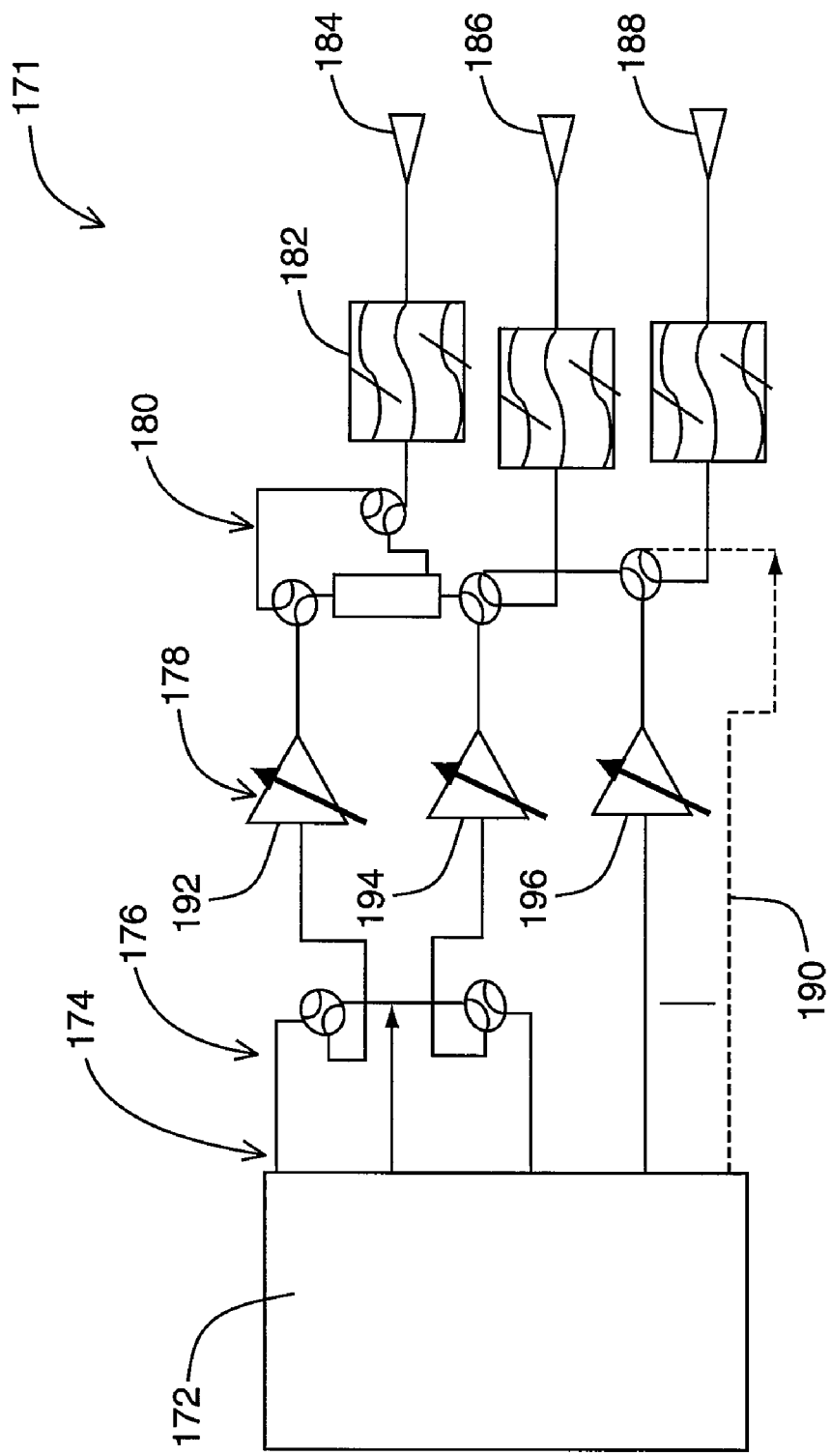
FIG. 10A shows a schematic illustration of an exemplary implementation of the transmitting system of FIG. 8A.

FIG. 10A shows an example of an implementation 171 of the generic transmitting system 104 of FIG. 8A for transmitting beams to a co-polarized set of cells of the frequency reuse pattern shown in any of FIGS. 5A-7C from a single multi-beam satellite, where each cell corresponds to a single beam. The apparatus comprises a flexible channelization filtering and switching unit 172 that transmits signals at a variety of frequencies at multiple filter and switching outputs 174, and that, on command, switches the frequency of the signal at a chosen filtering and switching output 174. The filtering and switching outputs 174 are each connected through one of a first set of parallel switches 176 to at least one flexible high power amplifier 178. The switches 176 and 180 can either be set so that 1 filter output can be connected to 2 amplifiers operating in parallel providing 2 times the power to support 2 times the filter bandwidth or the switches can be set so that 2 narrower filter outputs can each be connected to a single amplifier. The flexible high power amplifiers 178 may be Traveling Wave Tube Amplifiers, Solid State Power Amplifiers, Multi-port Amplifier(s) or any other suitable flexible high power amplifier known in the art.

The flexible high power amplifiers 178 are connected to a second set of parallel switches 180. Each of the second set of parallel switches 180 is connected to one of a set of wideband output filters 182, which are in turn each connected to one of a set of polarizing antenna feeds 184, 186, 188. The polarizing antenna feeds 184, 186, 188 are co-polarized, and produce a co-polarized set of beams servicing cells within a set in a frequency reuse pattern on the ground. As indicated by the dotted lines 190, the circuit components increased in different embodiments to accommodate additional signal paths to additional polarizing antenna feeds.

In the transmitting system 171 for transmitting a co-polarized set of a frequency reuse pattern shown in FIG. 10A, the first set of parallel switches 176 and the second set of parallel switches 180 are each configured such that two of the flexible high power amplifiers 178 may be used in parallel to double the amplification of a signal. In FIG. 10A, a first amplifier 192 and a second amplifier 194 are used in parallel. It will be appreciated by those skilled in the art that the switches may be substituted for other types of switches without departing from the spirit of the invention. Similarly, the transmitting system may or may not provide the option of using two amplifiers in parallel for one signal without departing from the spirit of the invention. In addition, Matrix amplifiers (MPA) or other forms of distributed amplification can be used to provide flexible reallocation of satellite transmit power without the need of output switches (180) or flexible individual HPAs.

In operation, the flexible channelization filtering and switching unit 172 produces a set of signals, each at a switchable frequency, at each of the filtering and switching outputs 174. The signal at each of the filtering and switching outputs 174 is then routed through at least one of the first set of parallel switches 176 into at least one of the set of parallel flexible high power amplifiers 178. More than one variable amplifier 192, 194 may be used in parallel to increase the amplification of a signal. Alternatively, each signal may be routed into only one 196 of the set of parallel flexible high power amplifiers 178. Each amplified signal is then routed through at least one of the second set of parallel switches 180 into one of the set of parallel wideband output filters 182, and finally into one of the set of polarized antenna feeds 184, 186, 188 for transmission. The polarized signal transmitted by the antenna corresponds to beam servicing a a cell in a frequency reuse pattern.

At any time, in response to capacity requirements on the ground, the frequency of a given feed may be switched by a command to the flexible channelization filtering and switching unit 172. The amplification of the resulting switched signal may also be reduced or increased according to a command to the variable amplifier 178. As a result, the signal arriving at each of the polarized antenna feeds 184, 186, 188 may vary in both frequency and satellite transmit power, and each of the resulting beams and cells corresponding to each of the feeds 184, 186, 188 may also vary in frequency but substantially constant PFD. Any changes in frequency and satellite transmit power of the signals at each of the polarized antenna feeds 184, 186, 188 are limited only by the requirements that adjacent resulting cells must not have the same frequency, and that the PFD's of proximal cells of the same frequency must be substantially uniform.

It will be understood by those skilled in the art that the transmitting system 171 shown in FIG. 10A produces one co-polarized set of cells in a frequency reuse pattern. Since the transmitting system 171 can only transmit one co-polarized set, a multi-beam communications system of the present invention requires more than one transmitting system 171 to produce a frequency reuse pattern comprising a plurality of interleaved sets of alternating polarization. In some embodiments, where the sets comprise a large number of cells, the multi-beam communications system may require more than one transmitting system 171 per set of the frequency reuse pattern. Since the frequency and satellite transmit power adjustments in a co-polarized set of the pattern are independent of the frequency and satellite transmit power adjustments of the adjacent sets, the more than one transmitting systems 171 work in parallel, but essentially independently of one another, to provide the entire frequency reuse pattern.

It will be further understood by those skilled in the art that the system shown in FIG. 10A is only one exemplary embodiment of a system that can be used to achieve a flexible frequency reuse pattern according to one aspect of the invention.

Figures 10B, 10C:
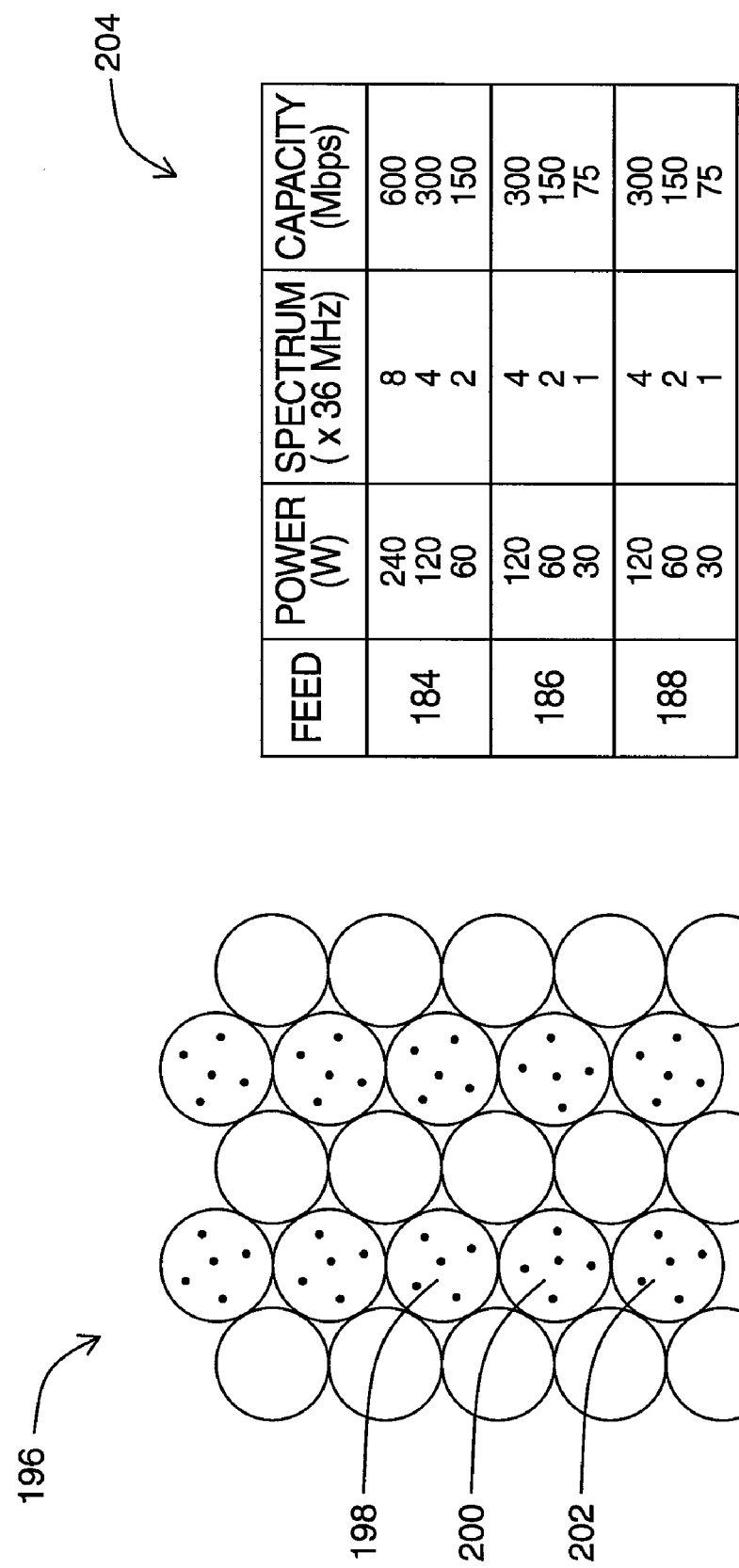
FIG. 10B shows another exemplary frequency reuse pattern.
FIG. 10C is a chart illustrating the power, spectrum, and capacity configurations of a set of exemplary polarizing antenna feeds of the apparatus of FIG. 1A.

Reference is now made to FIG. 10B, which shows another exemplary frequency reuse pattern 196 comprising a first cell 198 that corresponds to the first polarized antenna feed 184 of the transmitting system 171 of FIG. 10A, a second cell 200 that corresponds to the second polarized antenna feed 186 of the transmitting system 171 of FIG. 1A, and a third cell 202 that corresponds to the third polarized antenna feed 188 of FIG. 10A. The first cell 198, second cell 200 and the third cell 202 form part of a co-polarized row 124 in exemplary frequency reuse pattern 196. The frequency and satellite transmit power of the first cell 198, second cell 200 and third cell 202 fluctuate according to the switches in frequency and adjustment of amplification in the apparatus of FIG. 10B.

FIG. 10C is a chart 204 illustrating the satellite transmit power, spectrum and capacity configurations of a set of exemplary polarizing antenna feeds 184, 186, 188 of the system of FIG. 10A. Each of the three polarizing antenna feeds 184, 186, 188 can transmit a signal in a plurality of frequencies. For example, the first polarizing antenna feed 184 can transmit signals at each of 288 MHz, 144 MHz and 72 MHz. The second polarizing antenna feed 186 and the third polarizing antenna feed 188 can transmit signals at each of 144 MHz, 72 MHz and 36 MHz.

At any given time, each of the polarizing antenna feeds may transmit a signal at one of its respective three possible frequencies, limited only by the requirement that no two feeds transmitting to adjacent copolarised cells may transmit signals at the same frequency, in order to reduce loss of capacity due to interference. In the illustrated example, the frequency transmitted by the second polarizing antenna feed 186 must at all times be different from the frequencies transmitted by the first polarizing antenna feed 184 and the second polarizing antenna feed 188. However, the first polarizing antenna feed 184 and the second polarizing antenna feed 188 may transmit at a common frequency.

The satellite transmit power level of the signal for each of the frequencies is substantially uniform across the three feeds, which satisfies the requirement that the PFD's of the resulting proximal cells of a common frequency be substantially uniform. Since the capacity of a cell is dependent on both satellite transmit power and spectrum, the transmitting system 171 may switch the capacity of any of the cells 118, 120, 122 corresponding to the polarizing antenna feeds 184, 186, 188 by switching the satellite transmit power and spectrum as illustrated in FIG. 10C.

It will be appreciated by those skilled in the art that although the chart in FIG. 10C illustrates the properties of only three polarizing antenna feeds 184, 186, 188, to the transmitting system may be extended to include an arbitrarily large number of polarizing antenna feeds limited only by technological restrictions. It will also be appreciated that the values of satellite transmit power, spectrum and capacity are exemplary only, and may be varied without departing from the spirit of the invention.

It will be appreciated by those skilled in the art that, the transmitting systems shown in FIGS. 8A to 10C may be used to transmit any cell patterns consisting of interleaved sets of alternating polarization. For example, a transmitting system corresponding to those shown in FIGS. 8A to 10C may be used to transmit one, more than one, or part of one concentric circle in the cell pattern of FIG. 7A, or may be used to transmit one, more than one, or part of one chevron in the frequency reuse pattern of FIG. 7B.

The exemplary systems described above all relate to one satellite projecting one set of beams. However, the flexibility of the frequency reuse pattern may be expanded by adding additional collocated satellites to the same orbital position. The additional satellites may provide additional sets of cells that can expand the coverage area by interleaving with the existing sets. The allocation and movement of frequency, bandwidth and satellite transmit power among the cells corresponding to the additional satellite may occur independently of the allocation and movement of frequency, bandwidth and satellite transmit power among the cells corresponding to the original satellite, so long as the resultant overall frequency reuse pattern conforms to the requirements outlined above. As previously noted, these parameters can be adjusted over time in response to changing capacity requirements. Accordingly, the transmitters used by these satellites are capable of reallocating frequency, bandwidth and satellite transmit power over time.

Alternatively, additional satellites may be added to an orbital slot to increase the capacity of the cells in the existing frequency reuse pattern. In order to use additional satellites to increase the capacity of cells in an existing frequency reuse pattern, the transmitting systems of the satellites require an additional layer of switching.

Figure 11A:
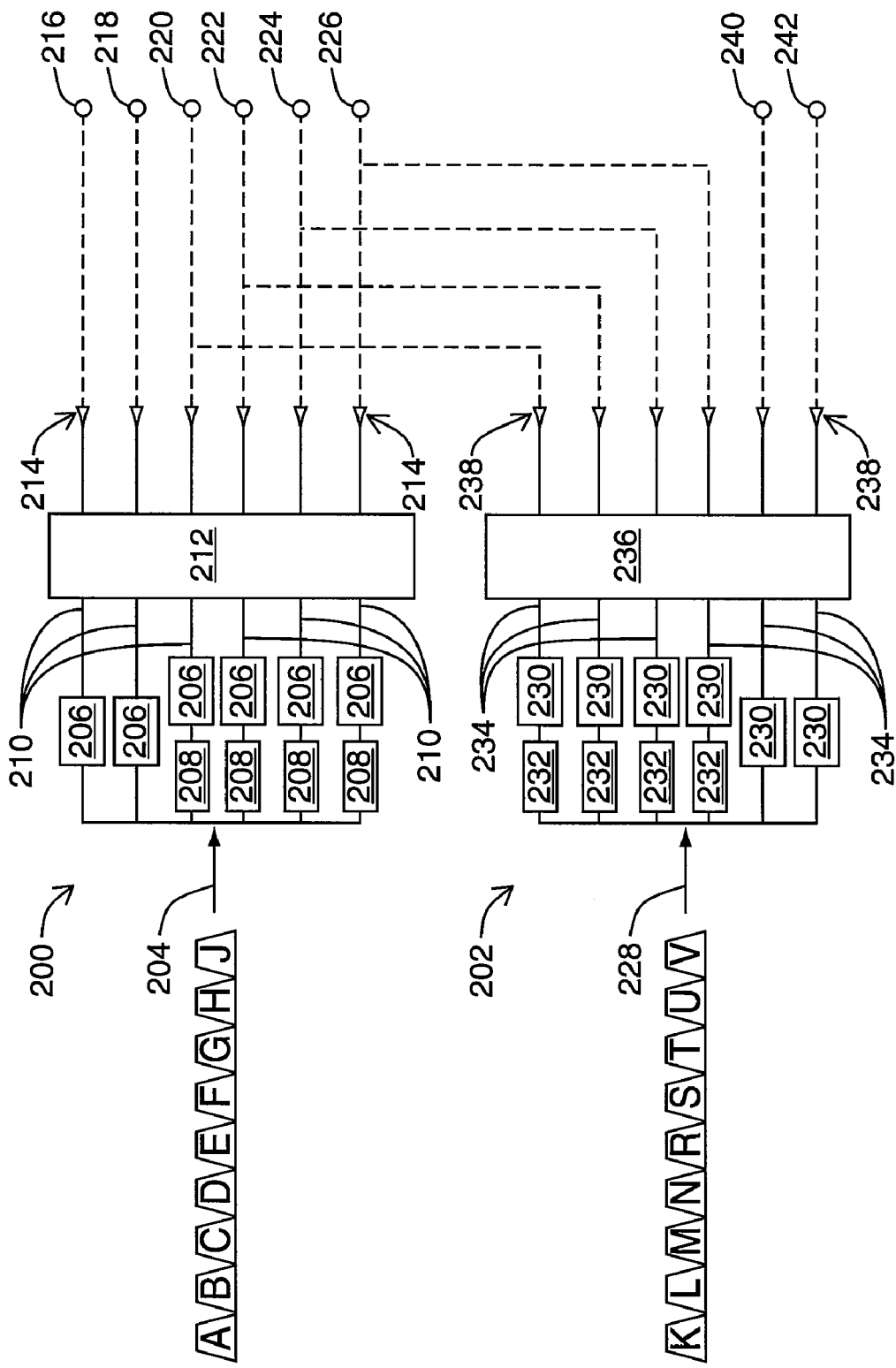
FIG. 11A is a schematic diagram of a first transmitting system corresponding to a first satellite, and a second transmitting system, corresponding to a second, collocated satellite.

Reference is now made to FIG. 11A, which shows a schematic diagram of a first transmitting system 200 corresponding to a first satellite, and a second transmitting system 202, corresponding to a second, collocated satellite.

The first transmitting system 200 comprises an uplink channel 204, which transmits a first broad bandwidth, consisting of the sub-bands A, B, C, D, E, F, G, H, J to six flexible filters 206, which make up the flexible filtering stage of the transmitting system. In anticipation of the launch of a second, collocated satellite, individual filter switches 208 are incorporated into the first transmitting system 200 upstream of four of the six flexible filters 206. The flexible filters 206 allocate the sub-bands among six downlink channels 210. The first transmitting system 200 further comprises a flexible amplification stage 212, which amplifies the signals at the downlink channels and transmits the downlink channels to six polarizing antenna feeds 214. The six antenna feeds 214 transmit beams servicing a first cell 216, a second cell 218, a third cell 220, a fourth cell 222, a fifth cell 224 and a sixth cell 226. When all of the filter switches 208 in the first transmitting system 200 are closed, the first transmitting system 200 projects six polarized beams to all six cells 216, 218, 220, 222, 224, 226, and the sub-bands A, B, C, D, E, F, G, H, J are allocated among the six cells.

The second transmitting system 202 comprises an uplink channel 228, which transmits a second broad bandwidth, consisting of the sub-bands K, L, M, N, R, S, T, U, V to six flexible filters 230, which make up the flexible filtering stage of the second transmitting system 202. Individual filter switches 232 are incorporated into the second transmitting system 202 upstream of four of the six flexible filters 230. The flexible filters 230 allocate the sub-bands among six downlink channels 234. The second transmitting system 202 further comprises a flexible amplification stage 236, which amplifies the signals at the downlink channels and transmits the downlink channels to six polarizing antenna feeds 238. The six antenna feeds 238 transmit beams servicing the third cell 220, the fourth cell 222, the fifth cell 224, the sixth cell 226, a seventh cell 240 and an eighth cell 242.

In FIG. 11A, the transmit beams are shown as dashed lines to indicate the relative connections between system components. However, in FIG. 11A, the system is not in operation.

Figure 11B:
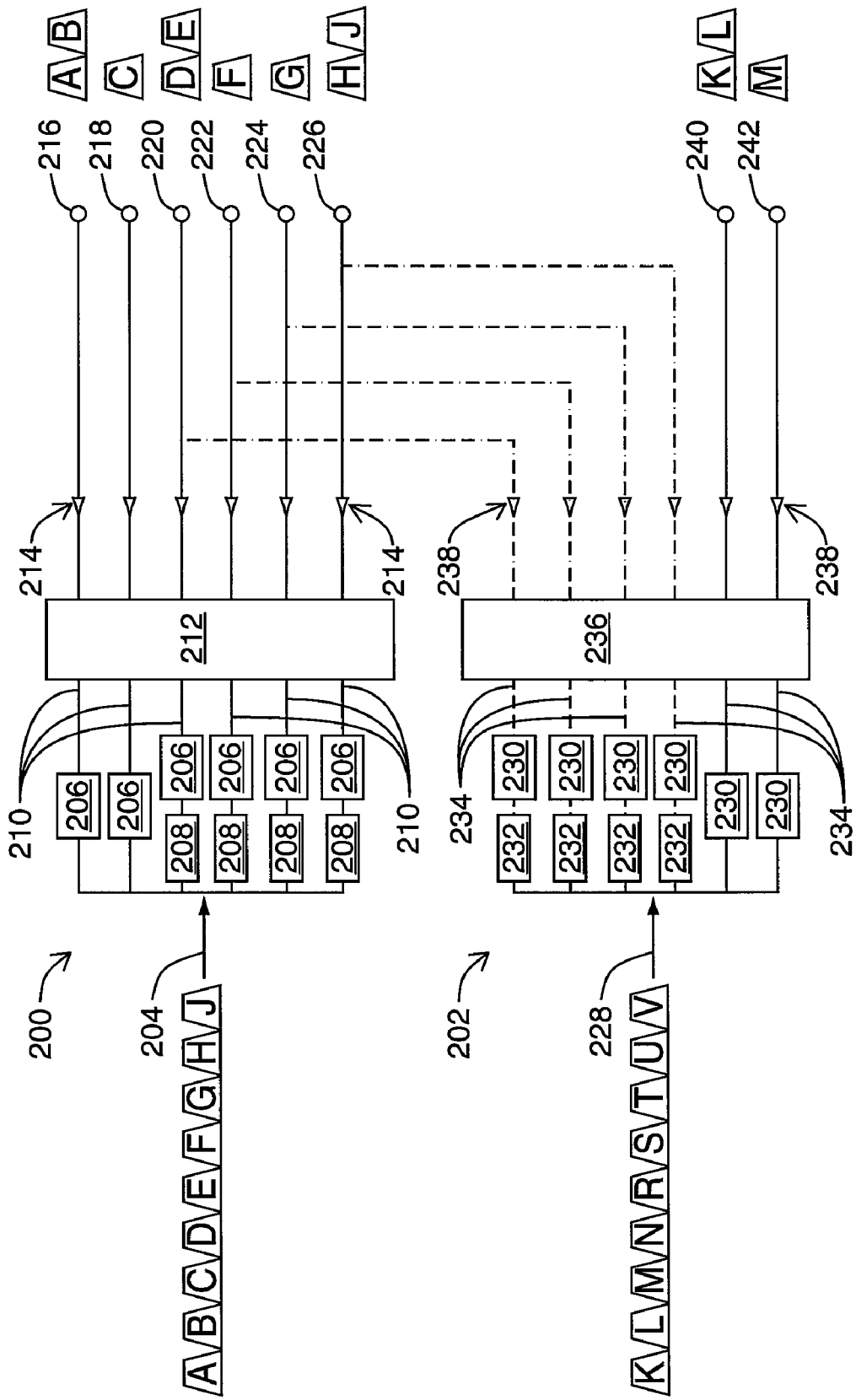
FIG. 11B shows an exemplary embodiment of a two-satellite system.

Reference is now made to FIG. 11B which shows an exemplary embodiment of a two-satellite system in which a second satellite containing the second transmitting system 202 is deployed to add additional sets of cells to a frequency reuse pattern. In this case, the four filter switches 208 in the first transmitting system 200 are closed, as indicated by the solid lines extending from the antenna feeds 214, and the first transmitting system 200 projects beams to the first six cells 216, 218, 220, 222, 224, 226, allocating the sub-bands A, B, C, D, E, F, G, H, J among the first six cells 216, 218, 220, 222, 224, 226. The four filter switches 232 in the second transmitting system 202 remain open, as indicated by the dashed lines extending from the antenna feeds 214, and the second transmitting system 202 projects beams to the seventh cell 240 and eighth cell 242, allocating the sub-bands K, L, and M among them. It will be understood by those skilled in the art that any or all of the sub-bands K, L, M, N, R, S, T U, V may be allocated among the seventh cell 240 and eighth cell 242 in this configuration.

Figure 11C:
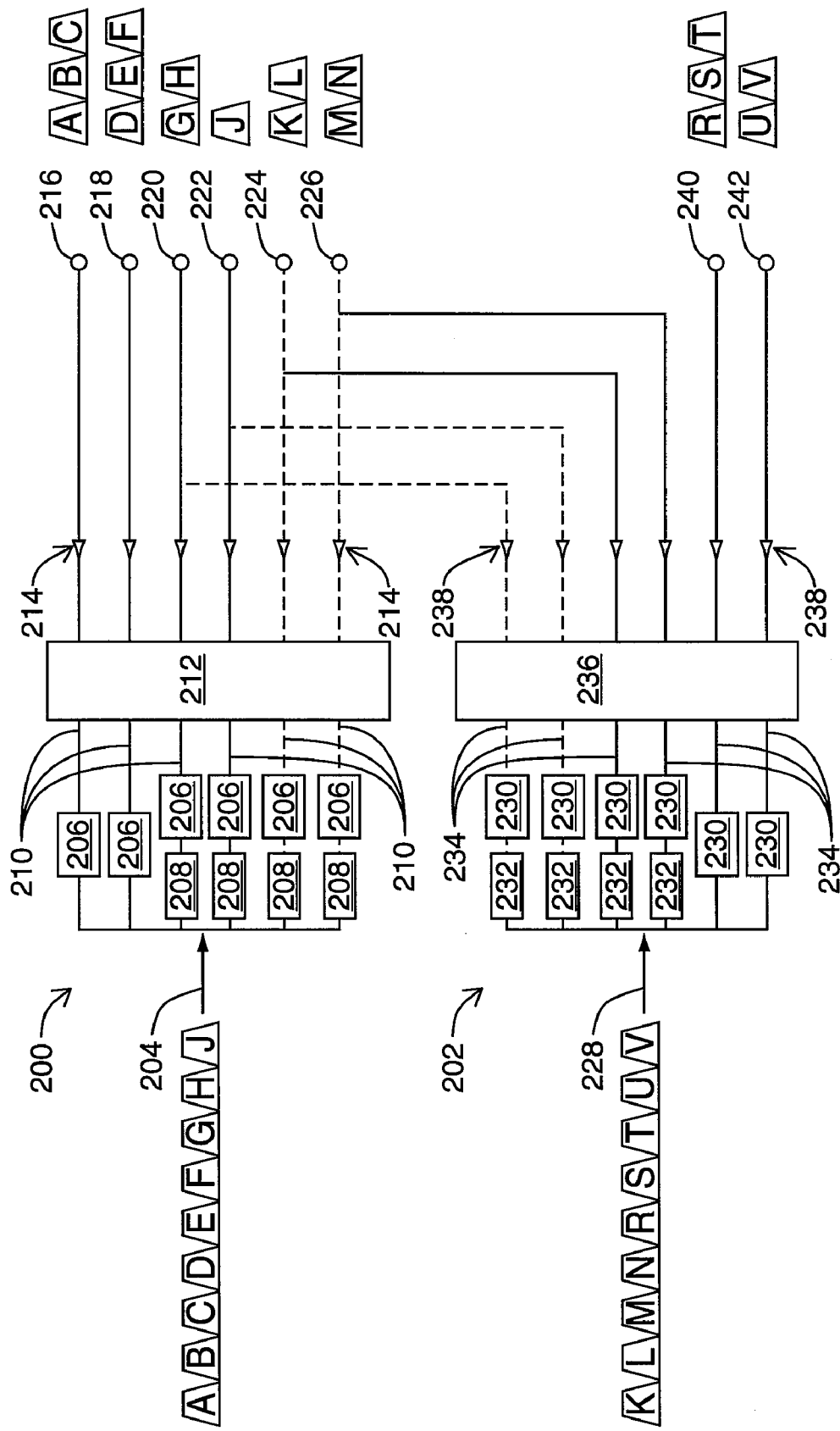
FIG. 11C shows an exemplary embodiment of a two-satellite system.

Reference is now made to FIG. 11C which shows an exemplary embodiment of a two-satellite system in which a second satellite containing the second transmitting system 202 is launched to increase the capacity of existing cells in a frequency reuse pattern. In this case, two of the filter switches 208, corresponding to the fifth cell 224 and the sixth cell 226, in the first transmitting system 200 are open. This allows the sub-bands A, B, C, D, E, F, G, H, J to be concentrated in the first 216, second 218, third 220 and fourth 222 cells, thereby increasing the capacity of the first four cells 216, 218, 220, 222 relative to the capacity of the first four cells 216, 218, 220, 222 when the sub-bands are allocated among six cells 216, 218, 220, 222, 224, 226. Two of the filter switches 232 in the second transmitting system 202, corresponding to the third cell 220 and the fourth cell 222, are open. The remaining two of the filter switches 232, corresponding to the fifth cell 224, 226 and the sixth cell, are closed. The second transmitting system 202 allocates the sub-bands K, L, M, N, R, S, T, U, V among the fifth 224, sixth 226, seventh 240 and eighth 242 cells.

It will be understood by those skilled in the art that the transmitting systems shown in FIGS. 11A to 11C are by way of example only. The number of cells, number of switches, and possible reallocations between the satellites may be varied according to the requirements and limitations of a system in question. Furthermore, the number of transmitting systems is not restricted to two and may be increased in other embodiments of the invention.

It will be understood by those skilled in the art that the use of satellites located in multiple orbital slots can be used to increase the communication capacity to a service area. Such constellations of satellites are known in the art. Provided that the different orbital slots are separated by a required minimum number of degrees, as is known in the art, beams from multiple satellites may be projected to the same cell, independent of one another to the point of sharing frequency and polarization, to increase capacity, so that in any cell the same frequency and polarization can be simultaneously serviced from multiple satellites in the separate orbital slots. It is known in the prior art that the transmissions from one orbital slot will contribute as interference to the transmissions from the next adjacent orbital slot when common frequencies and polarizations are employed. The embodiments of the frequency reuse patterns described herein can also be extended to such constellations of satellites.

Figure 12A:
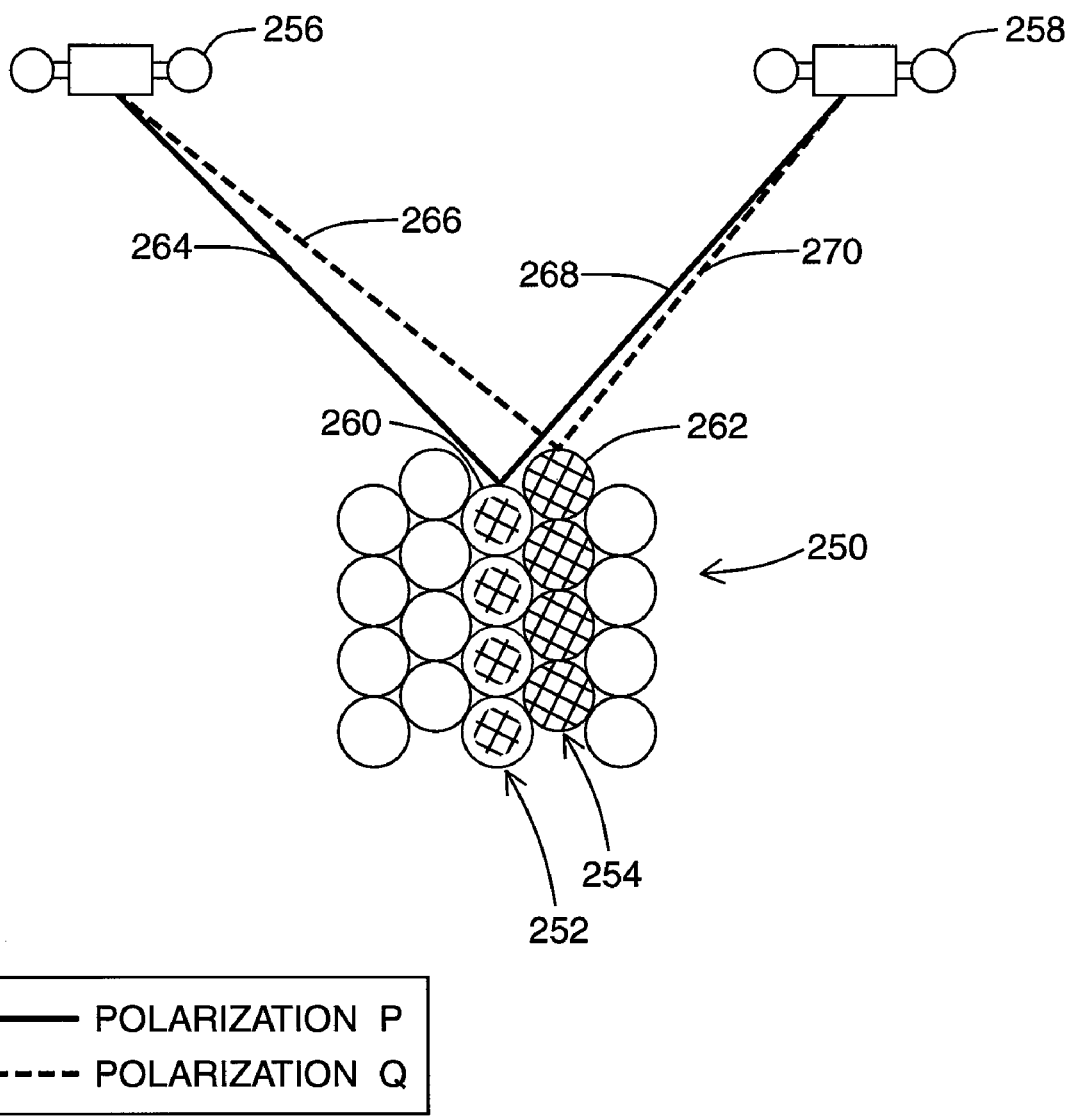
FIG. 12A shows a schematic diagram of an exemplary frequency reuse pattern serviced by satellites in more than one orbital slot.

Reference is now made to FIG. 12A, which shows a schematic diagram of an exemplary frequency reuse pattern 250, comprising a first set of cells 252 and a second set of cells 254, serviced by a first satellite 256, located in a first orbital slot, and a second satellite 258, located in a second orbital slot. The first set of cells 252 and the second set of cells 254 may be serviced simultaneously by beams transmitted by transmitting systems on both the first satellite 256 and the second satellite 258.

FIG. 12A shows a first cell 260, within the first set of cells 252, and a second cell 262, within the second set of cells 254. Transmitting systems on the first satellite 256 transmit a first beam 264 of polarization P to the first cell 260, and a second beam 266 of polarization Q to the second cell 262. Transmitting systems on the second satellite 258 transmit a third beam 268 of polarization P to the first cell 262 and a fourth beam 270 of polarization Q to the second cell 264. The angular difference between the first beam 264 and third beam 268, and the second beam 266 and fourth beam 270 is sufficiently large that the interference between the beams is not problematic, even though the beams servicing a given cell have a common polarization. Frequency, bandwidth and satellite transmit power may therefore be allocated among the cells by the transmitting systems on the first satellite 256 independent of the second satellite 258, and vice versa in accordance with the various embodiments described herein.

Figure 12B:
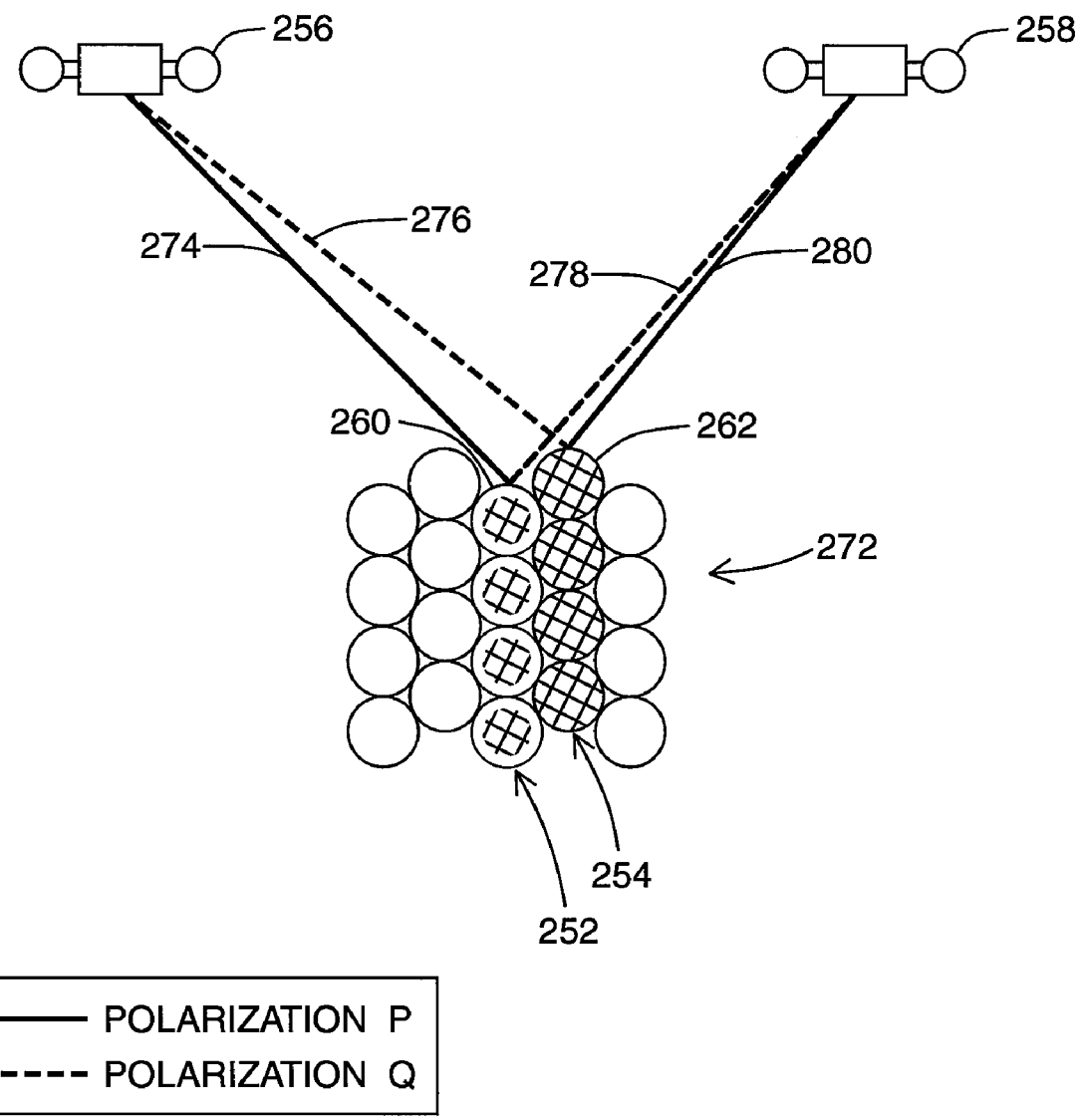
FIG. 12B shows a schematic diagram of another exemplary frequency reuse pattern serviced by satellites in more than one orbital slot.

Reference is now made to FIG. 12B, which shows an alternative embodiment of the application of a constellation of satellites to a frequency reuse pattern 272. FIG. 12B shows a schematic diagram of an exemplary frequency reuse pattern 272, comprising a first set of cells 252 and a second set of cells 254, serviced by a first satellite 256, located in a first orbital slot, and a second satellite 258, located in a second orbital slot. The first set of cells 252 and the second set of cells 254 may be serviced simultaneously by beams transmitted by transmitting systems on both the first satellite 256 and the second satellite 258.

FIG. 12B shows a first cell 260, within the first set of cells 252, and a second cell 262, within the second set of cells 254. Transmitting systems on the first satellite 256 transmit a first beam 274 of polarization P to the first cell 260, and a second beam 276 of polarization Q to the second cell 262. Transmitting systems on the second satellite 258 transmit a third beam 278 of polarization Q to the first cell 260 and a fourth beam 280 of polarization P to the second cell 262. Each of the first cell 260 and the second cell 262 is thereby illuminated with two orthogonally polarized signals. The angular difference between the first beam 274 and third beam 278, and the second beam 276 and fourth beam 280 is sufficiently large that the interference between the beams is not problematic. Frequency, bandwidth and satellite transmit power may therefore be allocated among the cells by the transmitting systems on the first satellite 256 independent of the second satellite 258, and vice versa. Furthermore, there will be a statistical improvement in self-interference due to the user terminals having better close-to-beam crosspolar isolation compared to copolar isolation.

It will be understood by those skilled in the art that, although FIGS. 12A and 12B show systems employing two orbital slots, the number of satellites and orbital slots may be increased in other embodiments.

While various embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for accommodating changes in capacity requirements in the service area of at least one satellite comprising:
    subdividing the service area into at least two interleaved sets of cells;
    assigning one of two orthogonal polarizations to each set of cells, such that adjacent cells from different sets alternate in polarization;
    providing for flexible allocation of satellite transmit power to one or more cells in at least a first set of cells;
    providing for flexible allocation of bandwidth and frequency to one or more cells in, at least, the first set of cells, and providing that no two adjacent cells within the sets of cells share a common frequency at any given time; and,
    reallocating satellite transmit power, bandwidth and frequency among the cells of at least the first set of cells, independently of the satellite transmit power, bandwidth and frequencies of the cells in other sets of cells, in response to changes in capacity requirements in the service area.

2. The method of claim 1, further comprising reallocating satellite transmit power with frequency among the cells of, at least, the first set of cells such that the power flux densities of proximal cells having the same frequency and polarization are substantially uniform.

3. The method of claim 1, wherein each cell within the first set of cells is adjacent to a maximum of two other cells from the first set of cells.

4. The method of claim 1, wherein a plurality of satellite beams servicing the at least two interleaved sets of cells are projected from one of, a single satellite, and at least two different collocated satellites.

5. A method for accommodating changes in capacity requirements in a service area covered by at least two orbital slots, the method comprising:
    subdividing the service area into at least two interleaved sets of cells;
    providing for at least two sets of beams from a first satellite in a first orbital slot to service at least two of the interleaved sets of cells;
    assigning a polarization to each set of beams from the at least one satellite in the first orbital slot, such that the sets of beams servicing the interleaved sets of cells from the first orbital slot alternate in polarization;
    providing for at least one set of beams from a second satellite in a second orbital slot to service at least one of the at least two interleaved sets of cells;
    assigning a polarization to each set of beams from the second satellite such that the sets of beams servicing interleaved sets of cells from the second orbital slot alternate in polarization, and such that, for a set of cells serviced by two sets of beams from the first and second orbital slots, the two sets of beams are of orthogonal polarization;
    providing for flexible allocation of satellite transmit power to at least one cell;
    providing for flexible allocation of bandwidth and frequency to at least one cell, and providing that no two beams from a common orbital slot servicing two adjacent cells within a set of cells share a common frequency at any given time; and,
    reallocating satellite transmit power, bandwidth and frequency among the cells of at least one set of cells serviced from the first orbital slot, independently of the satellite transmit power, bandwidth and frequencies of the cells in other sets of cells serviced from the first orbital slot, and independently of the satellite transmit power, bandwidth and frequencies of the cells in all sets of cells serviced from the second orbital slot, in response to changes in capacity requirements in the service area.

6. A method for accommodating changes in capacity requirements in a service area covered by at least two orbital slots, the method comprising:
    subdividing the service area into at least two interleaved sets of cells;
    providing for at least two sets of beams from a first satellite in a first orbital slot to service at least two of the interleaved sets of cells;
    assigning a polarization to each set of beams from the at least one satellite in the first orbital slot, such that the sets of beams servicing the interleaved sets of cells from the first orbital slot alternate in polarization;

providing for at least one set of beams from a second satellite in a second orbital slot to service at least one of the at least two interleaved sets of cells;

assigning a polarization to each set of beams from the second satellite such that the sets of beams servicing interleaved sets of cells from the second orbital slot alternate in polarization, and such that, for a set of cells serviced by two sets of beams from the first and second orbital slots, the two sets of beams have the same polarization;

providing for flexible allocation of satellite transmit power to at least one cell;

providing for flexible allocation of bandwidth and frequency to at least one cell, and providing that no two beams from a common orbital slot servicing two adjacent cells within a set of cells share a common frequency at any given time; and, reallocating satellite transmit power, bandwidth and frequency among the cells of at least one set of cells serviced from the first orbital slot, independently of the satellite transmit power, bandwidth and frequencies of the cells in other sets of cells serviced from the first orbital slot, and independently of the satellite transmit power, bandwidth and frequencies of the cells in all sets of cells serviced from the second orbital slot, in response to changes in capacity requirements in the service area.

7. A method of using a flexible frequency reuse pattern to accommodate changing capacity requirements in a satellite service area wherein the method comprises:

establishing a flexible frequency reuse pattern comprising at least two interleaved sets of co-polarized cells, wherein no two adjacent cells of a single set may share a common frequency, and wherein the polarization of each set of cells is orthogonal to the polarization of the adjacent interleaved sets of cells; providing for flexible allocation of bandwidth and frequency to at least one cell, and providing that no two beams from a common orbital slot servicing two adjacent cells within a set of cells share a common frequency at any given time; and reallocating satellite transmit power, bandwidth and frequency among the cells of at least one set, independently of the satellite transmit power, bandwidth and frequencies of other sets, in response to changes in capacity requirements in the service area.

8. The method of claim 7, wherein the frequency reuse pattern is projected from one of, a single satellite, at least two different collocated satellites and at least two different satellites occupying at least two different orbital slots.

9. A transmitting system for transmitting to at least a part of a set of cells within a frequency reuse pattern for a multi-beam satellite communications system, comprising:

a flexible filtering stage, having an uplink input, and a plurality of outputs for transmitting signals from the flexible filtering stage, wherein the flexible filtering stage is configured to flexibly allocate frequencies and bandwidths among the outputs;

a flexible amplification stage coupled to the outputs of the flexible filtering stage for variably amplifying the signals provided at each of the plurality of outputs; and, a plurality of co-polarized polarizing antenna feeds coupled to the flexible amplification stage for transmitting the amplified signals as beams to a co-polarized set of cells, wherein the transmitting system allocates and reallocates frequencies, bandwidths, and satellite transmit power levels among the cells of the set of cells in response to capacity requirements on the ground.

10. The transmitting system of claim 9, wherein the flexible filtering stage is configured such that any two adjacent outputs never have the same frequency at a given time, such that of any two adjacent spot beams transmitted by that transmitting system never have the same frequency at a given time.

11. The transmitting system of claim 10, wherein at least one of the flexible amplification stages comprises one of Traveling Wave Tube Amplifiers and Solid State Power Amplifiers.

12. The transmitting system of claim 10, wherein the flexible filtering stage is configured to alter the frequency and bandwidth of any given spot beam transmitted from a polarizing antenna feed while the satellite is in orbit.

13. The transmitting system of claim 12, wherein the flexible amplification stage is configured to alter the satellite transmit power of any given spot beam transmitted from a polarizing antenna feed while the satellite is in orbit in order to maintain constant power flux density within the beam.

14. A multi-beam communications system comprising a plurality of the transmitting systems of claim 13.

15. A multi-beam communications system of claim 14, wherein the co-polarized polarizing antenna feeds in each transmitting system are polarized in one of two orthogonal polarizations.

16. The multi-beam communications system of claim 15, wherein the multi-beam communications system is configured to transmit interleaved co-polarized sets of cells, where adjacent sets of cells alternate in orthogonal polarization, and wherein two adjacent cells within a given set of cells never share a common frequency at a given time.

17. The multi-beam communications system of claim 16, wherein each of the transmitting systems is configured to allocate and reallocate at least one of frequencies, bandwidths, and satellite transmit power levels among the cells in the set of cells transmitted by the polarizing antenna feeds of that transmitting system, in response to capacity requirements on the ground.

18. The multi-beam communications system of claim 17, wherein the system is configured such that each of the transmitting systems allocates frequencies and bandwidths among the outputs of that transmitting system independently of the other transmitting systems in the multi-beam communications system.

19. The multi-beam communications system of claim 18, wherein the transmitting systems are supported by one satellite.

20. The multi-beam communications system of claim 18, wherein the allocations and reallocations of at least one of frequencies, bandwidth and satellite transmit power occurs when the satellite is in orbit.

21. The multi-beam communications system of claim 17, wherein the transmitting systems are located on more than one collocated satellite.

22. The multi-beam communications system of claim 20, wherein the allocations and reallocations of at least one of frequencies, bandwidth and satellite transmit power occurs when the satellite is in orbit.

23. The multi-beam communications system of claim 21, wherein the addition of an additional collocated satellite increases the capacity of at least one set of cells by facilitating concentration of frequencies among the cells.

24. The multi-beam communications system of claim 21, wherein the addition of an additional collocated satellite increases the number of cells.

* * * * *